US012659285B2

(12) United States Patent
Lambert

(10) Patent No.: US 12,659,285 B2
(45) Date of Patent: Jun. 16, 2026

(54) ADDING AND REMOVING RECIPIENTS OF A DIGITAL COMMUNICATION BY ANALYZING THE CONTENT OF EMAILS RECEIVED, OR ABOUT TO BE SENT, BASED ON THEIR EFFECT

(71) Applicant: Mark Lambert, Tarpon Springs, FL (US)

(72) Inventor: Mark Lambert, Tarpon Springs, FL (US)

(73) Assignee: Mark Lambert, Tarpon Springs, FL (US)

( * ) Notice: Subject to any disclaimer, the term of this patent is extended or adjusted under 35 U.S.C. 154(b) by 48 days.

(21) Appl. No.: 18/960,896

(22) Filed: Nov. 26, 2024

(65) Prior Publication Data

US 2026/0149684 A1      May 28, 2026

(51) Int. Cl.
*H04L 51/21*          (2022.01)
*H04L 51/063*         (2022.01)
(Continued)

(52) U.S. Cl.
CPC .......... *H04L 51/214* (2022.05); *H04L 51/063* (2013.01); *H04L 51/212* (2022.05)

(58) Field of Classification Search
None
See application file for complete search history.

(56) References Cited

U.S. PATENT DOCUMENTS 11,710,000 B1 *   7/2023   Cuan ..................... G06F 16/345
                                                              709/206
2002/0099719 A1   7/2002   Schwitters et al.
(Continued)

FOREIGN PATENT DOCUMENTS

FR          3026504 A1      4/2016

OTHER PUBLICATIONS

Panimalar et al., "A Review of Chrun Prediction Models Using Different Machine Learning and Deep Learning Approaches in Cloud Environment", Journal of Current Science and Technology, Jan.-Apr. 2023, vol. 13(1), pp. 136-161.
(Continued)

*Primary Examiner* — Cai Y Chen
(74) *Attorney, Agent, or Firm* — Perkins Coie LLP; Alberto Araiza; Lena Petrovic

(57)          ABSTRACT

A system uses artificial intelligence to analyze digital communications to determine their effect on recipients by evaluating the tone, feeling, and attitude of the content. The system assigns weighted values to these analyzed elements to calculate whether the digital communication will have a positive, neutral, or negative effect on the recipients. When a negative effect is detected, the system suggests removing the negatively affected recipients and proposes alternative content changes to eliminate the negative impact. The system also detects confidential information through confidentiality labels and warns users when attempting to share such information with unauthorized recipients. Additionally, the system analyzes related digital communications and folders thereof to identify potential missing recipients based on subject matter relevance and communication history while detecting when message subject matter may be irrelevant to certain recipients by analyzing previous communication patterns.

23 Claims, 24 Drawing Sheets

(51) Int. Cl.
H04L 51/212 (2022.01)
H04L 51/214 (2022.01)

(56) References Cited

U.S. PATENT DOCUMENTS

| | | |
|---|---|---|
| 2011/0010182 A1 | 1/2011 | Williams et al. |
| 2011/0307804 A1 | 12/2011 | Spierer |
| 2015/0264004 A1 | 9/2015 | Khoo |
| 2017/0054667 A1 | 2/2017 | Brown et al. |
| 2018/0239495 A1 | 8/2018 | Sharifi et al. |
| 2019/0089660 A1 | 3/2019 | Bellegarda |

OTHER PUBLICATIONS

ISA, International Search Report for International Application No. PCT/US2024/036178, mailed on Oct. 23, 2024, 27 pages.
Goel, Ajay. "How to Create Folders in Gmail (Step-by-Step Guide)." GMass Blog, Oct. 30, 2021, www.gmass.co/blog/how-to-create-folders-in-gmail/. Accessed Apr. 3, 2026. (Year: 2021).
Heath, Catherine. "Get Organized with Gmail Labels." Keeping, Jun. 9, 2022, www.keeping.com/content/gmail-labels/. Accessed Apr. 3, 2026. (Year: 2022).
Kidson, Russell. "Organize Your Inbox with Gmail Color-Coded Labels." Softonic, Softonic EN, Jun. 14, 2024, en.softonic.com/articles/gmail-color-coded-labels. Accessed Apr. 3, 2026. (Year: 2024).
Naha, Priya. "Gmail Labels: A Guide to Keep Your Inbox Organized." ControlHippo, Jul. 9, 2024, controlhippo.com/blog/email/gmail-labels/. Accessed Apr. 3, 2026. (Year: 2024).

* cited by examiner

2100

ADDING AND REMOVING RECIPIENTS OF A DIGITAL COMMUNICATION BY ANALYZING THE CONTENT OF EMAILS RECEIVED, OR ABOUT TO BE SENT, BASED ON THEIR EFFECT

BACKGROUND

Electronic mail (email or e-mail) is a method of transmitting and receiving messages using electronic devices. Email is a ubiquitous and very widely used communication medium. Email operates across computer networks, primarily the Internet, and also local area networks. Today's email systems are based on a store-and-forward model. Email servers accept, forward, deliver, and store messages. Neither the users nor their computers are required to be online simultaneously; they need to connect, typically, to a mail server or a webmail interface to send or receive messages or download them.

Email systems have become an integral part of modern communication, facilitating rapid and efficient exchange of information in both personal and professional contexts. As the volume and complexity of email communications have grown, so too has the need for more sophisticated tools to manage and optimize these interactions.

BRIEF DESCRIPTION OF THE DRAWINGS

Detailed descriptions of implementations of the present invention will be described and explained through the use of the accompanying drawings.

Figure 1:
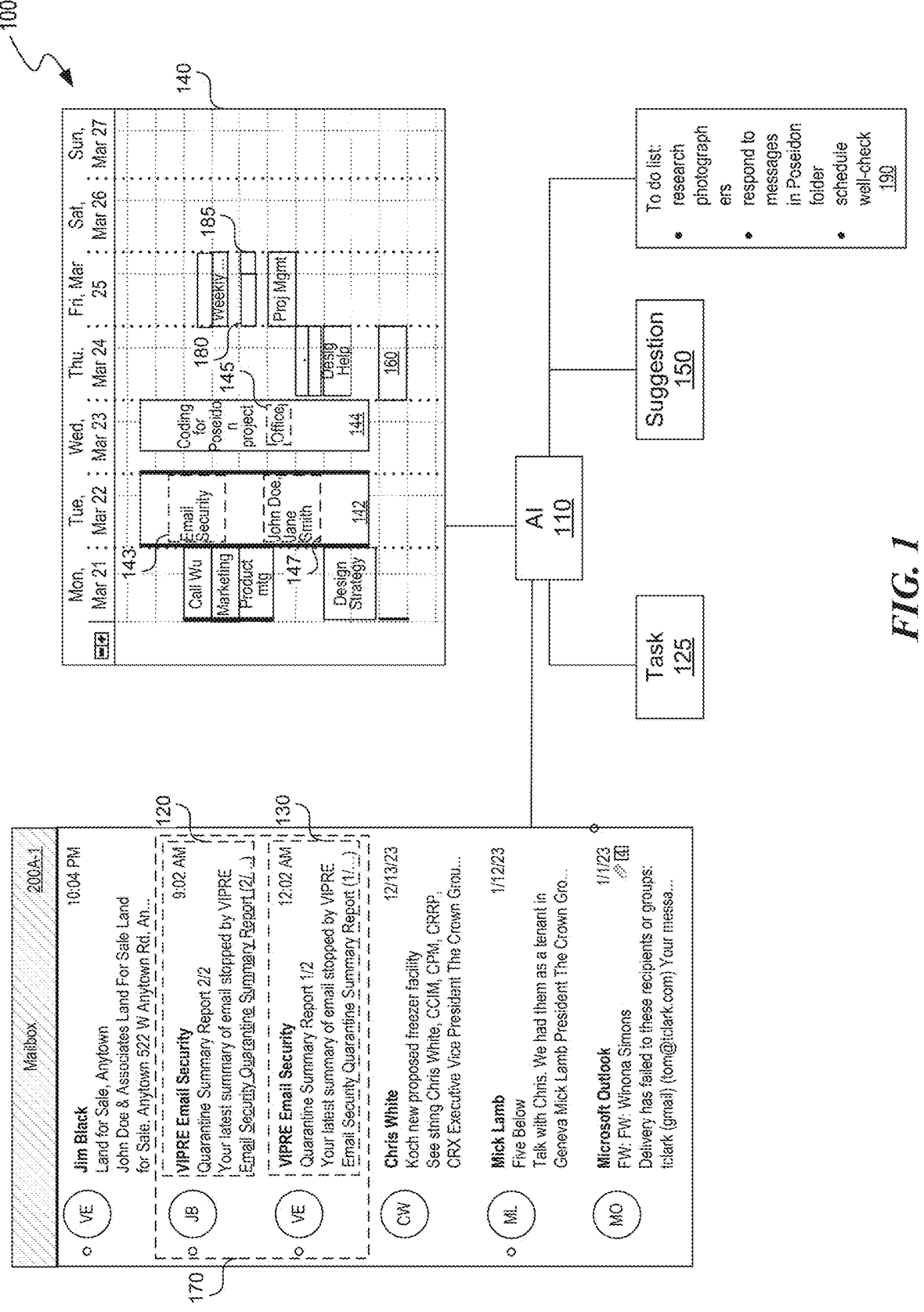
FIG. 1 shows a system where an artificial intelligence (AI) completes administrative tasks for a user based on content sent and received by the user.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In one embodiment, the disclosed technology is directed to enhancing email and calendar management through artificial intelligence. The system begins by obtaining multiple email messages and calendar entries associated with a user. Artificial intelligence (AI) then analyzes the email messages to identify tasks mentioned within them, particularly those related to existing calendar entries. For each identified task, the system retrieves relevant information, including the existence of a related calendar entry, subject matter, location, and invitees. If a calendar entry related to the task does not exist, the system suggests creating one and requests the user's approval. Upon receiving approval, the system creates the entry. The AI then identifies a group of email messages relevant to the calendar entry based on the invitees and subject matter. Using AI, the system creates a summary of these related email messages and sends this summary to the user. This process aims to streamline task management, improve calendar organization, and provide concise summaries of relevant email conversations, enhancing overall productivity and communication efficiency.

In another embodiment, the system obtains multiple email messages associated with a user and obtains a criterion among the multiple criteria for grouping the multiple email messages. The system checks whether the criterion grouping makes sense, i.e., whether there are two or more non-zero groups. The multiple criteria can include a tone associated with an email message among the multiple email messages, a feeling associated with the email message among the multiple email messages, an attitude associated with the email message among the multiple email messages, an attachment associated with the email message among the multiple email messages, a meeting, a to-do item, a contact, and an event, where the event can be an external event. The tone associated with the email message can include an implicit feeling expressed by the email message, the feeling associated with the email message can include an explicitly expressed feeling by the email message, and an attitude can include a pattern of behavior expressed over a first multiplicity of email messages associated with the user. The system suggests to the user to group the multiple email messages according to the criterion, obtains multiple categories associated with the criterion, and upon obtaining approval from the user to group the multiple email messages, groups the multiple email messages into multiple groups corresponding to the multiple categories associated with the criterion.

In a third embodiment, the system obtains an email message and an attachment associated with an email message, where the attachment is included in the email message or the attachment is included in a previous email message to which the email message is responding. The system creates, using an artificial intelligence (AI), a summary of the email message and a summary of the attachment, where the summary of the email message includes a statement A, and the summary of the attachment includes a statement B. The summary can be an outline and can include multiple statements. The system creates, using the AI, an embedding vector A representing the statement A and an embedding vector B representing the statement B, where the embedding vector A and embedding vector B are numerical vectors in multidimensional space. The system determines whether the statement A associated with the email message and the statement B associated with the attachment are related by performing the following two steps. First, the system determines a distance between the embedding vector A and the embedding vector B in the multidimensional space. Second, the system determines whether the statement A and the statement B are related by comparing the distance to a predetermined threshold. For example, the system can measure the distance between two vectors using cosine similarity. When the predetermined threshold is above 0.7, the system can determine that the two vectors are related. Upon determining that the statement A associated with the email message and the statement B associated with the attachment are related, the system determines, using artificial intelligence, whether the email message addresses the statement B associated with the attachment. For example, if the statement B is a question, the system determines whether the email message A answers the question. Upon determining that the email message A does not address the statement B associated with the attachment, the system generates, based on the email message and the statement B, a modification to the email message, where the modification addresses the statement B associated with the attachment.

In a fourth embodiment, the system obtains an email message A and an email message B, where the email message B is a response to the email message A. The system analyzes, using AI, the email message A and the email message B to obtain emotive content A and B associated with the email message A and B, respectively. The emotive content A includes a tone A, a feeling A, and an attitude A, and the emotive content B includes a tone B, a feeling B, and an attitude B. The tones A and B include an implicit feeling expressed by the email messages A and B, respectively, such as "if you had only been there." The feeling A and B include an explicitly expressed feeling by the email messages A and B, respectively, such as "I really like you." The attitude A and B include a pattern of behavior expressed over multiple email messages, such as "my team is the best." The system determines whether the tone B, the feeling B, and the attitude B match the tone A, the feeling A, and the attitude A, respectively. Upon determining that the tone B, the feeling B, and the attitude B do not match the tone A, the feeling A, and the attitude A, the system suggests a change to the email message B, where the change to the email message B causes the tone B, the feeling B, and the attitude B to match the tone A, the feeling A, and the attitude A, respectively. The system receives an approval of the change. Upon receiving the approval, the system makes the change to the email message B.

In a fifth embodiment, the disclosed technology relates techniques for removing recipients of a digital communication when the digital communication may have a negative effect on one or more of the recipients. The disclosed technology can obtain an email (e.g., an email a user is drafting) that can include one or more recipients, one or more subject matters, and email content. The email content can include email text, emojis, images, gifs, an audio file, and other communication methods attachable to an email (e.g., a pdf).

With the disclosed technology, an artificial intelligence (AI) can analyze an email for its emotive content such as tone, feeling, and attitude. Tone can include an implicit feeling expressed by the email, feeling can include feelings expressed explicitly in the email, and attitude can include a pattern of behavior expressed by an individual over previous emails. In the disclosed technology, the AI can also determine an effect of the email on the one or more recipients based on the analyzed tone, feeling, and attitude. Additionally, the AI can label a determined effect as a positive, neutral, or negative effect. For example, the AI can label an email drafted by a user to a recipient that says "You did great!" as one with a positive effect on the recipient. Based on the determined effect, the disclosed technology can suggest that a user remove one or more recipients from the email. For example, if a user intends to send an email to Ann and Bob saying "Ann is better than Bob," the disclosed technology can recognize that the email may have a negative effect on Bob and suggest that the user remove Bob as a recipient.

An Email Management System Enabling an AI to Complete Administrative Tasks for a User Based on Content Sent and Received by the User FIG. 1 shows a system where an artificial intelligence (AI) completes administrative tasks for a user based on content sent and received by the user. The system 100 includes an AI 110 that can obtain multiple messages 120, 130 associated with the user. The messages 120, 130 can be electronic messages including text-based messages (e.g., email messages, Short Message Service, Multimedia Messaging Service, Rich Communication Services), voice messages, multimedia messages, etc. The AI 110 can obtain information 140 external to the multiple messages 120, 130 that is related to the multiple messages 120, 130. The information 140 can be a calendar and can include multiple calendar entries 142, 144 associated with the user, results of an Internet search associated with the message 120, 130, a to-do list associated with the user, etc.

The AI 110 can analyze a message 120, 130 to determine a task 125 indicated in the message, where the task can be associated with a calendar entry 142, 144. The task can include an email to send, a meeting to schedule, a task associated with a project management system, etc.

The AI 110 retrieves information associated with the task 125, such as an indication of existence of the calendar entry 142, 144, subject matter, e.g., title 143, associated with the calendar entry, location 145 associated with the calendar entry, and invitees 147 associated with the calendar entry.

The AI 110 can determine whether the calendar entry exists. For example, the message 120, 130 can say, "I look forward to our meeting tomorrow." The AI 110 can obtain the sender information, e.g., John Doe, associated with the message 120, 130 and can formulate the task 125 to state, "Check the time of tomorrow's meeting with John Doe." The AI 110 can check the next day's meetings for a meeting with John Doe, and if such a meeting does not exist, the AI 110 can determine that the calendar entry is not included among the multiple calendar entries 142, 144. Upon determining that the calendar entry is not included among the multiple calendar entries, the AI 110 can create and present a suggestion 150 to the user to create the calendar entry 160 along with a request for approval.

In another example, the message 120, 130 can say, "Yes, lunch sounds like a great idea." The AI 110 can obtain the sender information, e.g., Jane Smith, associated messages 120, 130, and can formulate the task to state, "Make a reservation for lunch with Jane Smith." The AI 110 can create and present the suggestion 150, along with the request for approval, to the user to make a reservation at a particular restaurant at a particular time based on email conversations.

In a third example, the AI 110 can receive the messages 120, 130, which can say, "Let's discuss that." The AI 110 can determine free timeslots on the user's calendar. The AI 110, after obtaining the sender information associated with the messages 120, 130, can present the suggestion 150, along with requests for approval, to the user to schedule a meeting 160 with the sender at one of the free timeslots on the user's calendar.

Upon receiving the approval, the AI 110 can create the calendar entry 160. Upon receiving the rejection, the AI 110 can omit to perform the task 125.

Based on the invitees 147 associated with the calendar entry 142, 144 and the subject matter 143 associated with the calendar entry, the AI 110 can identify a group 170 of messages 120, 130 relevant to the calendar entry 142, 144. To identify the group 170, the AI 110 can obtain messages 120, 130 that list senders and/or recipients that are also invitees 147. In addition to, or instead of, identifying the group 170 of messages 120, 130, the AI 110 can identify the messages that are closely related to the subject matter 143. The AI 110 can create a summary of the group 170 of messages 120, 130 and can send the summary of the group of messages to the user.

To identify the messages that are closely related to the subject matter 143, the AI 110 can create a summary of each message 120, 130. The AI 110 can create an embedding vector representing summary of each message 120, 130 and an embedding vector representing the subject matter 143 in linguistic multidimensional space. Based on the distance between the embedding vectors, the AI 110 can determine similarity, where the smaller the distance between the embedding vectors, the higher the similarity.

The AI 110 can periodically analyze the calendar 140, such as twice a day, and provide suggestions based on the calendar entries. For example, the AI 110 can detect calendar entries 180, 185 that occur at the same time. The AI 110 can alert the user of the duplicate calendar entries 180, 185. In another example, the AI 110 can detect subject matter 143 of a calendar entry 142 and can offer suggestions related to the calendar entry. Specifically, if the calendar entry indicates a birthday party, the AI 110 can ask the user if the AI should suggest birthday present ideas.

If the user requests from the AI 110 to prepare necessary materials for my 11 o'clock meeting, the AI 110 can obtain the needed information by summarizing relevant messages or doing an Internet search, as described in this application. If there are multiple calendar entries 180, 185 at the 11 o'clock meeting, the AI 110 can ask for which calendar entry to find the needed information.

Instead of creating the calendar entry 160 based on the identify task 125, the AI 110 can create a to-do list 190. The AI 110 can send reminders based on message conversations and the to-do list 190.

Figure 2:
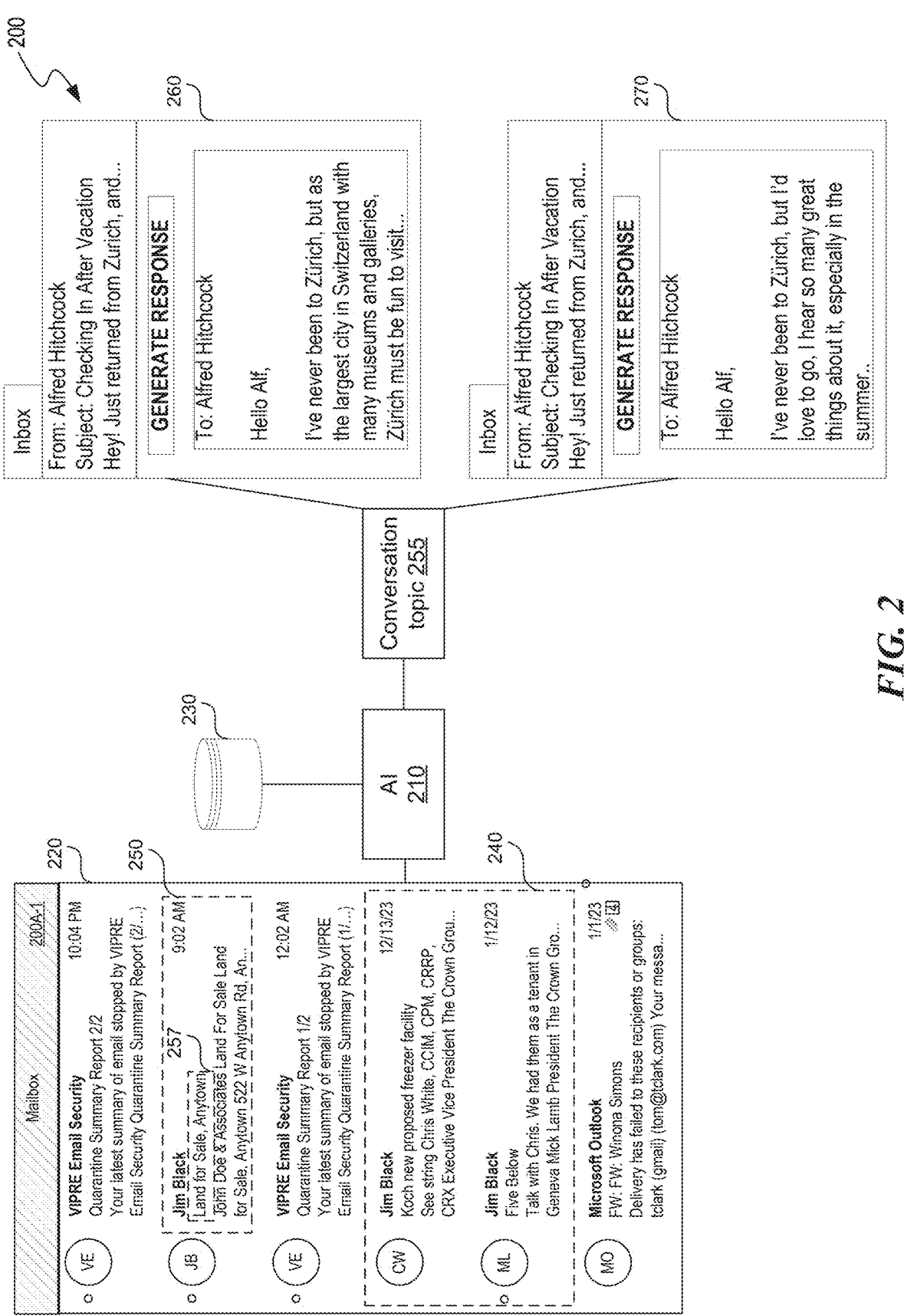
FIG. 2 shows a system to create responses and suggest conversational information to make the user's response more personalized.

FIG. 2 shows a system to create responses and suggest conversational information to make the user's response more personalized. For example, if the email is from a co-worker who just returned from Zürich, the AI can suggest asking the co-worker about unique facts pertaining to Zürich—e.g., "Did you get a chance to see all the yachts on Lake Zürich?"—even though the user never went to Zürich and does not know Zürich has a lake.

The system 200 can include an AI 210, multiple messages 220, and a database 230. The AI 210 can identify among the multiple messages 220 a second group 240 of messages relevant to a particular message 250 that the AI is currently analyzing. The second group 240 of messages can have the same sender as the message 250.

The AI 210 can identify among the second group 240 of messages a conversation topic 255, such as a visit to Zurich. The conversation topic 255 may not be necessarily related to the task 125 in FIG. 1 and may not be related to the title of the message 257, such as "land for sale." The AI 210 can search the database 230 based on the conversation topic to obtain related information. The database 230 can be the Internet.

Based on the multiple messages 220, the AI 210 can determine a style of communication associated with the user, such as frequently used interjections, adjectives and adverbs. The style of communication can also be analytical or personal.

The AI 210 can generate, using the AI 210, multiple responses 260, 270 to the email message, where a response among the multiple responses includes a reference to the conversation topic 255 in a style among the multiple styles. For example, the response 260 that is conversational can also be analytical, such as "I've never been to Zürich, but as the largest city in Switzerland with many museums and galleries, Zürich must be fun to visit." In another example, the response 270 that is conversational can also be personal, such as "I've never been to Zurich, but I'd love to go, I hear so many great things about it, especially in the summer."

The AI 210 can ask the user to select the response among the multiple responses. Upon receiving a selected response, e.g., response 260, from the user, the AI 210 can send the selected response 260.

In addition, the AI 210 can identify multiple conversational topics in the emails, such as the trip to Zürich, kids' graduation, or the other person's interest in a particular topic such as sports. The AI 210 can suggest various responses 260, 270, further making the reference to various conversation topics.

Figure 3:
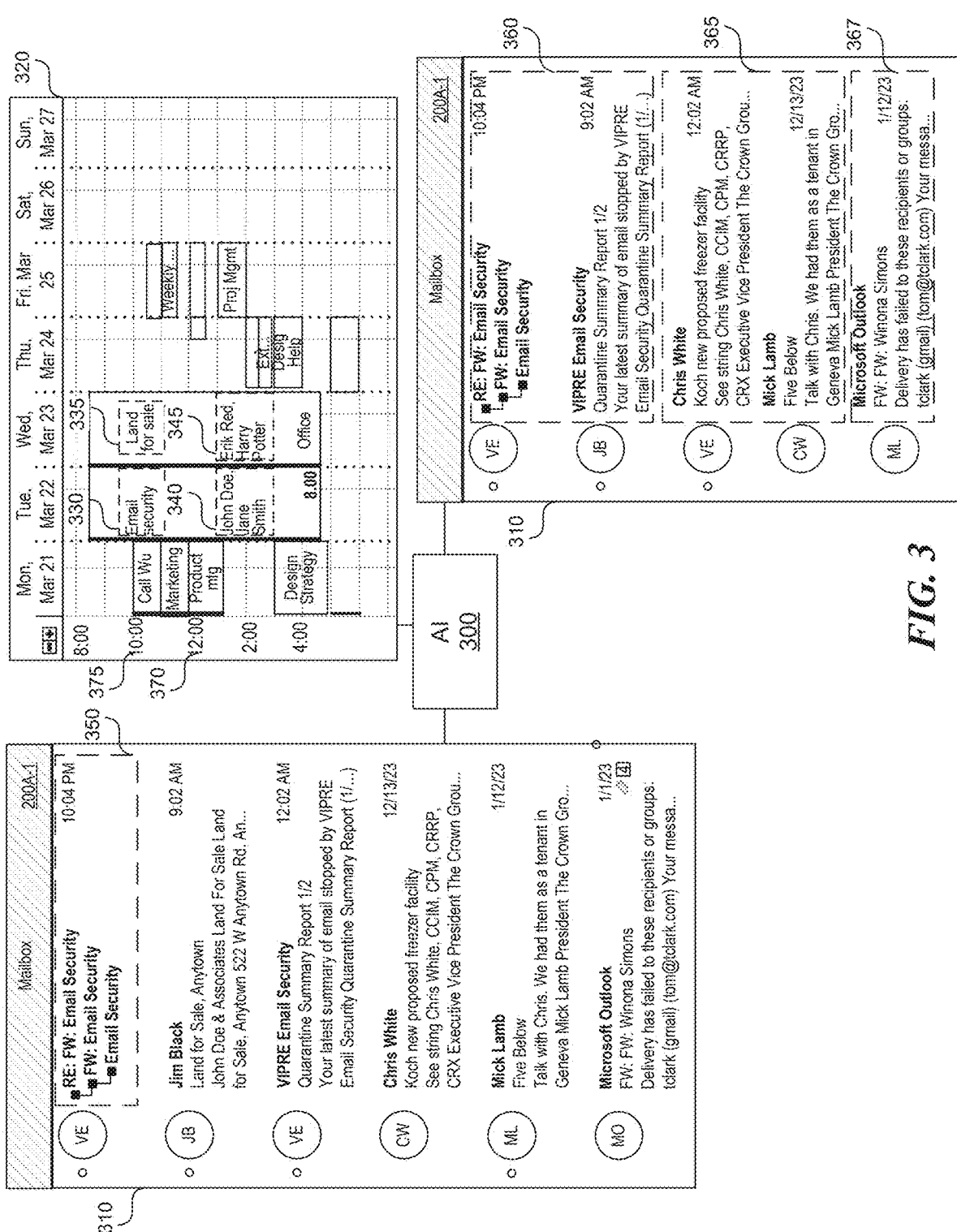
FIG. 3 shows a system to prioritize messages based on topic, sender, and inferred due date.

FIG. 3 shows a system to prioritize messages based on topic, sender, and inferred due date. The system 300, e.g., AI, can obtain grouping criteria associated with the multiple messages 310. The grouping criteria can include multiple topics 330, 335 associated with the calendar 320, groups of invitees 340, 345 associated with the calendar 320, and multiple threads 350 associated with the multiple email messages 310.

The system 300 can group the multiple email messages into multiple groups of email messages by creating multiple folders 360, 365, 367. Each folder 360, 365, 367 can include a group of messages that correspond to a criterion, such as matching topic 330, 335, matching group of invitees 340, 345, and matching thread 350.

When the grouping criterion is topic or group of invitees, the system 300 can obtain multiple occurrence times 370, 375 associated with the multiple calendar entries in each folder 360, 365, 367. The system 300 can determine the earliest occurrence time in each folder, and based on the earliest occurrence time in each folder, the system can sort and present the multiple folders to the user from most urgent to least urgent.

When the grouping criterion is inferred due date, the system 300 can obtain multiple due dates associated with the multiple threads by analyzing the multiple threads using the artificial intelligence. The system 300 can sort the multiple threads according to the due date from most urgent to least urgent.

Figure 4:
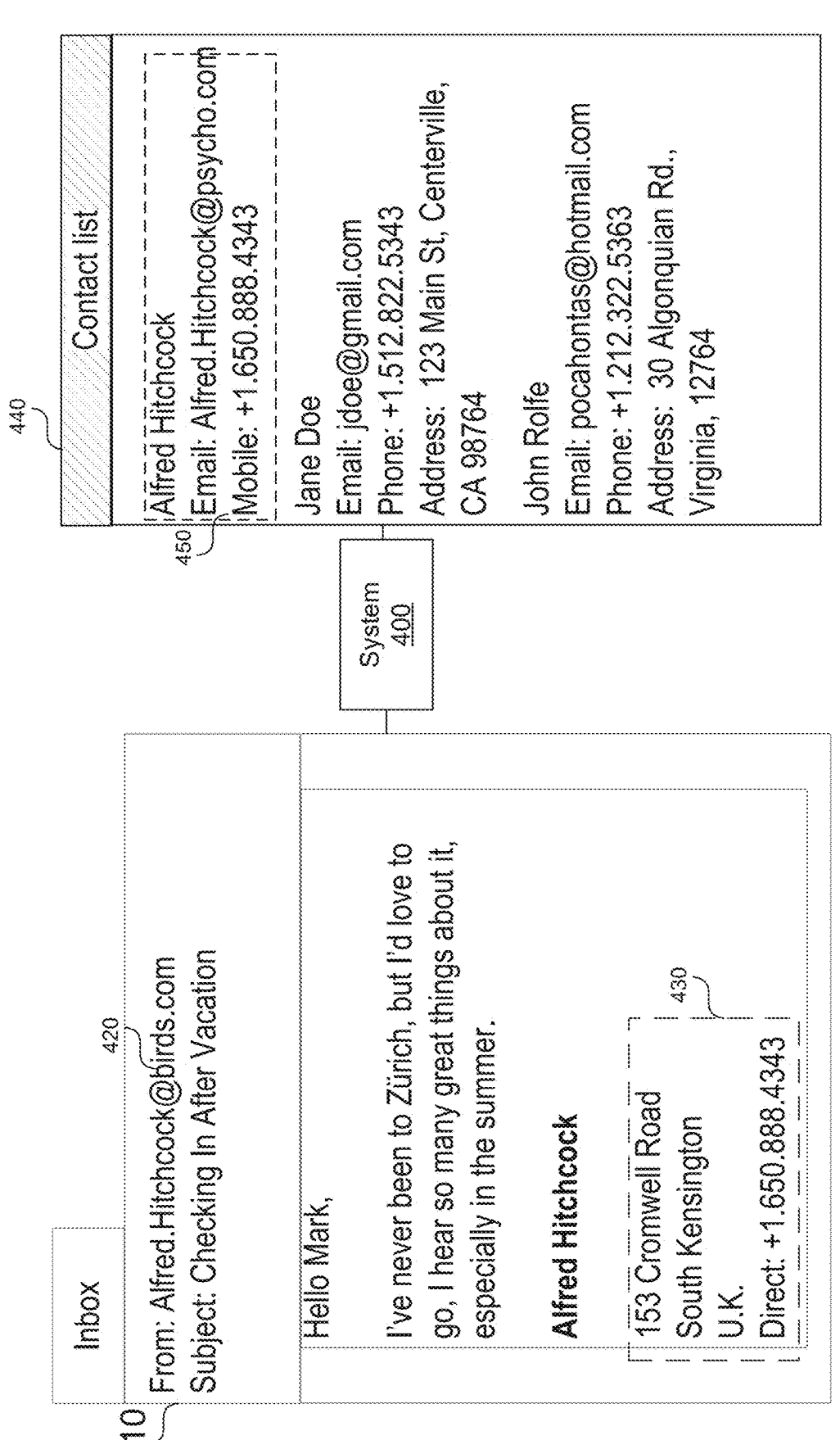
FIG. 4 shows a system to update contact information based on email conversations.

FIG. 4 shows a system to update contact information based on email conversations. The system 400 can analyze the received email message 410 and obtain contact information 420, 430 from the email message. The contact information 420, 430 can include email address, work phone, cell phone, web page, address, etc.

The system 400 can obtain a second contact information 450 associated with the sender from a source 440 different than the email message, such as a contact list. The system 400 can determine whether the contact information 420, 430 associated with the sender is different from the contact information 450 from the source 440. Upon determining that the contact information 420, 430 is different from the contact information 450, the system 400 can suggest updating the contact information 450 based on the contact information 420, 430.

Figure 5:
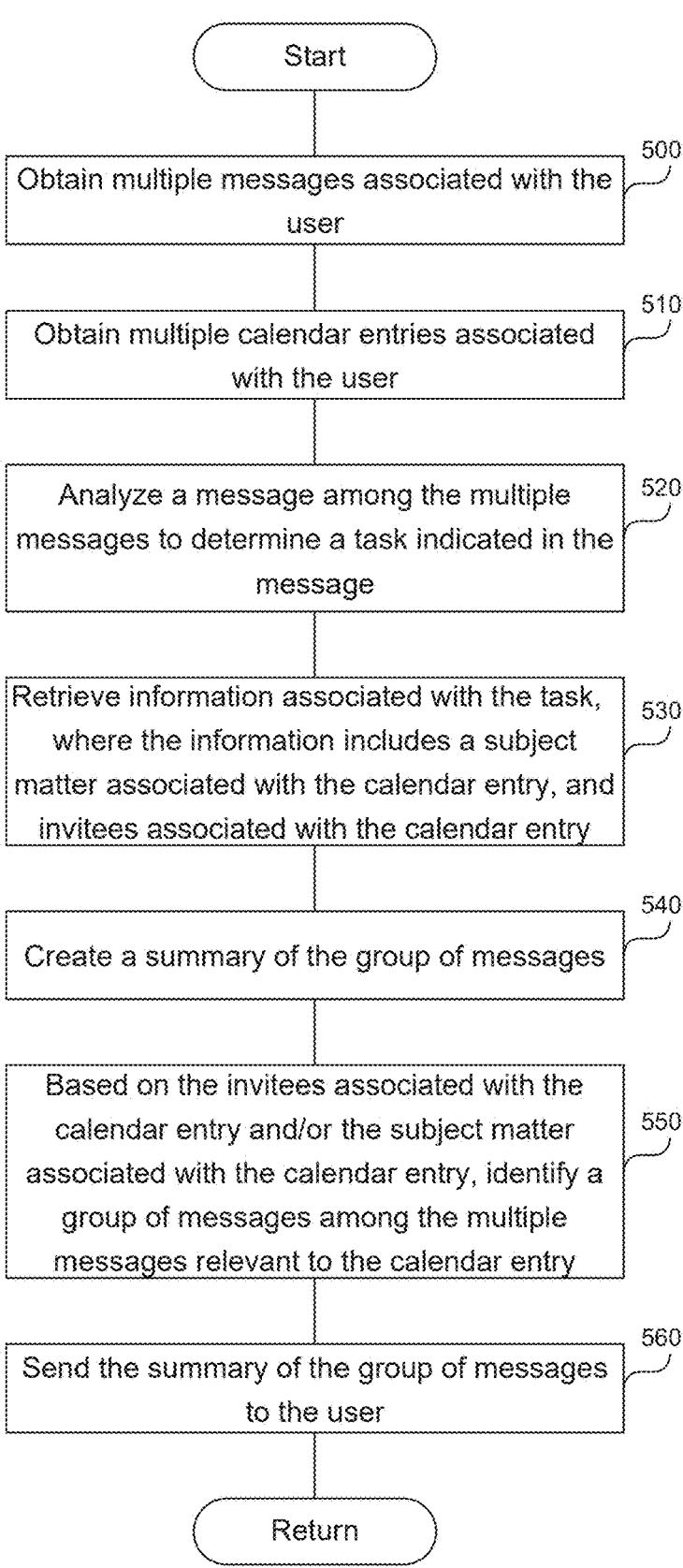
FIG. 5 is a flowchart of a method to enable an AI to complete administrative tasks for a user based on content sent and received by the user.

FIG. 5 is a flowchart of a method to enable an AI to complete administrative tasks for a user based on content sent and received by the user. A hardware or software processor executing instructions described in this application can, in step 500, obtain multiple messages associated with the user. The messages can be text messages, voice messages, multimedia messages, etc.

In step 510, the processor can obtain multiple calendar entries associated with the user. In step 520, the processor can analyze, using an AI, a message among the multiple messages to determine a task indicated in the message. The task can be associated with a calendar entry among the multiple calendar entries.

In step 530, the processor can retrieve information associated with the task, where the information includes a subject matter associated with the calendar entry, invitees associated with the calendar entry, an indication of existence of the calendar entry, and/or location associated with the calendar entry.

In step 540, based on the invitees associated with the calendar entry and/or the subject matter associated with the calendar entry, the processor can identify a group of messages among the multiple messages relevant to the calendar entry.

In step 550, the processor can create, using the artificial intelligence, a summary of the group of messages. In step 560, the processor can send the summary of the group of messages to the user.

The processor can retrieve information associated with the task, where the information includes an indication of existence of the calendar entry and/or location associated with the calendar entry. Based on the indication of existence of the calendar entry, the processor can determine whether the calendar entry is included among the multiple calendar entries. Upon determining that the calendar entry is not included among the multiple calendar entries, the processor can suggest to the user to create the calendar entry along with a request for approval. For example, the AI model can make a reservation based on email conversations and/or can schedule meetings based on email conversations. Upon receiving the approval, the processor can create the calendar entry. Upon receiving the rejection, the processor does not perform the action.

The AI model can create responses and suggest conversational information to make the user's response more personalized. For example, if the email is from a co-worker who just returned from Zurich, the AI can suggest asking the co-worker about unique facts pertaining to Zürich, such as "Did you get a chance to see all the yachts on Lake Zürich?" The processor can identify among the multiple messages a second group of messages relevant to the message, such as messages having the same sender. The processor can identify among the second group of messages a conversation topic. The conversation topic is not necessarily related to the task. The processor can perform a database search based on the conversation topic to obtain related information. The database can be the Internet. Based on the multiple messages, the processor can determine a style of communication associated with the user. The style can be a pattern of speech, frequently used interjections, adjectives, and/or adverbs. Based on the related information and the style of communication associated with the user, the processor can generate, using the AI, a response to the message, where the response includes a reference to the conversation topic in the style of communication associated with the user.

The processor can obtain multiple topics associated with the multiple calendar entries associated with the user, where a topic among the multiple topics is associated with a calendar entry among the multiple calendar entries. The processor can group the multiple messages into multiple groups of messages by creating multiple folders, where a first group of messages among the multiple groups of messages corresponds to the topic among the multiple topics and where a folder among the multiple folders includes the first group of messages. The processor can obtain multiple occurrence times associated with the multiple calendar entries, where an occurrence time among the multiple occurrence times corresponds to the topic among the multiple topics. Based on the multiple occurrence times, the processor can sort the multiple folders, e.g., from most urgent to least urgent.

The processor can obtain multiple groups of invitees associated with the multiple calendar entries associated with the user, where a group of invitees among the multiple groups of invitees is associated with a calendar entry among the multiple calendar entries. The processor can group the multiple messages into multiple groups of messages, where a sender and a receiver associated with a first group of messages among the multiple groups of messages match the group of invitees among the multiple groups of invitees. The processor can obtain multiple occurrence times associated with the multiple calendar entries, where an occurrence time among the multiple occurrence times corresponds to the group of invitees among the multiple groups of invitees. Based on the multiple occurrence times, the processor can sort the multiple groups of messages, e.g., from most urgent to least urgent.

The processor can obtain multiple threads associated with the multiple messages. The processor can obtain multiple due dates associated with the multiple threads by analyzing the multiple threads using the artificial intelligence, where a due date among the multiple due dates corresponds to a thread among the multiple threads. The processor can sort the multiple threads according to the due date, e.g., from most urgent to least urgent.

The AI can create and update a to-do list based on email conversations and can send reminders based on email conversations and a user's to-do list. Specifically, the processor can add the task indicated in the message to a to-do list. The processor can determine whether the task has been listed in the to-do list for a predetermined amount of time, such as a week or a month. Upon determining that the task has been listed in the to-do list for the predetermined amount of time, the processor can send a reminder associated with the task to the user.

The AI can update contact information based on email conversations and changes to a contact's signature line. Specifically, the processor can obtain, using the AI, first contact information from the message, where the first contact information is associated with the sender of the message. The contact information can be email, work phone, cell phone, web page, address, etc. The processor can obtain a second contact information associated with the sender from a source different than the message, such as a contact list. The processor can determine whether the first contact information associated with the sender is different from the second contact information associated with the sender. Upon determining that the first contact information is different from the second contact information, the processor can suggest updating the second contact information based on the first contact information.

Based on the subject matter associated with the calendar entry, the processor can perform a database, e.g., Internet, search to obtain related information. The processor can use the AI to summarize the related information and provide the related information to the user. The processor can conduct research for more information relevant to the meeting (or talk). For example, the AI can ask for which calendar entry to find related information if the calendar has multiple entries for a single time slot. Alternatively, the AI can ask if the user would like suggestions for present ideas for a birthday-related calendar entry.

The processor can provide options for the user to choose from for adding conversational information. The processor can identify among the multiple messages a second group of messages relevant to the message. The processor can identify among the second group of messages a conversation topic not related to the task. The processor can perform a database, e.g., Internet, search based on the conversation topic to obtain related information. The processor can obtain multiple styles of communication, including analytical, intuitive, functional, and/or personal. Based on the related information and the style of communication associated with the user, the processor can generate, using the artificial intelligence, multiple responses to the message, where a response among the multiple responses includes a reference to the conversation topic in a style among the multiple styles. The processor can ask the user to select the response among the multiple responses. Upon receiving a selected response from the user, the processor can send the selected response.

Analyzing Content of Received Emails to Sort Emails in a User's Inbox

Figure 6:
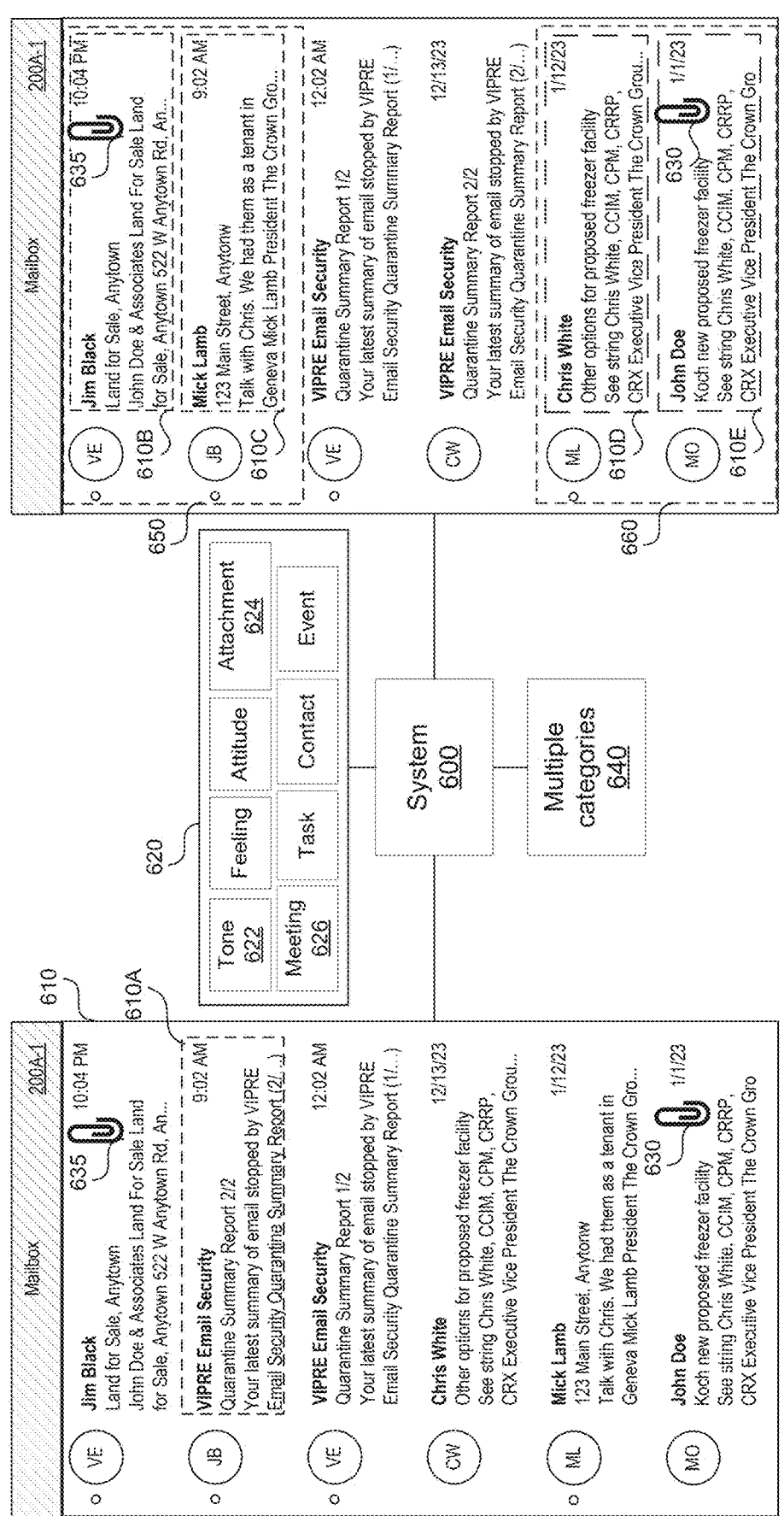
FIG. 6 shows a system to analyze the content of received emails to sort emails in a user's inbox.

FIG. 6 shows a system to analyze the content of received emails to sort emails in a user's inbox. The system 600 can obtain multiple messages 610 associated with a user and a criterion 622, 624, 626 (only three labeled for brevity) among the multiple criteria 620 for grouping the multiple messages. The multiple messages 610 can include text messages, voice messages, multimedia messages, etc.

The multiple criteria 620 can include a tone 622 associated with a message among the multiple messages, a feeling associated with the message, an attitude associated with the message, an attachment 624 associated with the message, a meeting 626, a task/to-do item, a contact, and/or an event. The event can be represented as a calendar meeting or an event not scheduled on the calendar and available on the Internet, such as a county fair, a concert, an exhibit, etc.

The tone associated with the message 610A includes an implicit feeling expressed by the message. For example, the message 610A stating "If you had only been there" has a positive tone and implies a positive feeling between two people. The feeling associated with the message 610A includes an explicitly expressed feeling by the message. For example, the message 610A stating "I really like you" explicitly states a positive feeling between two people. An attitude includes a pattern of behavior expressed over multiple messages 610 associated with the user. For example, multiple messages stating "My team is the best," "Great work team," and "You guys are the best" can indicate a positive attitude toward the group of people.

Upon obtaining the criterion, such as the attachment 624, the system can check whether grouping according to the criterion 622, 624, 626 is beneficial. Specifically, the system 600 can check whether grouping according to one or more attachments 630, 635 in the emails results in multiple groups of emails with more than one email in each group. If that is the case, the system 600 can suggest to the user to group the multiple messages 610 according to the criterion 622, 624, 626.

The system 600 can obtain multiple categories 640 associated with the criterion 622, 624, 626. For example, if the criterion is tone, feeling, and/or attitude, the categories can be positive, negative, and neutral. If the criterion is a contact, the categories can correspond to emails that contain the same sender and recipient. If the criterion is attachment, the categories can correspond to multiple unrelated attachments among the multiple messages 610. Similarly, if the criterion is a to-do item, a meeting, or an event, the categories can correspond to multiple unrelated items, meetings, or events, among the multiple in messages 610, respectively.

Upon obtaining approval from the user to group the multiple messages, the system 600 can group the multiple messages 610 into multiple groups 650, 660 corresponding to the multiple categories associated with the criterion.

For example, when the criterion is the attachment 624, as shown in FIG. 6, the system can group messages 610B in 610C into group 650 because they both relate to the attachment 635 describing a plot for sale, even though the titles of the emails and the senders of the messages 610B in 610C are different. Similarly, messages 610D and 610E can be grouped together into group 660 because they both relate to the attachment 630 about a freezer facility, even though the titles of the emails and the senders of the emails are different.

Figure 7:
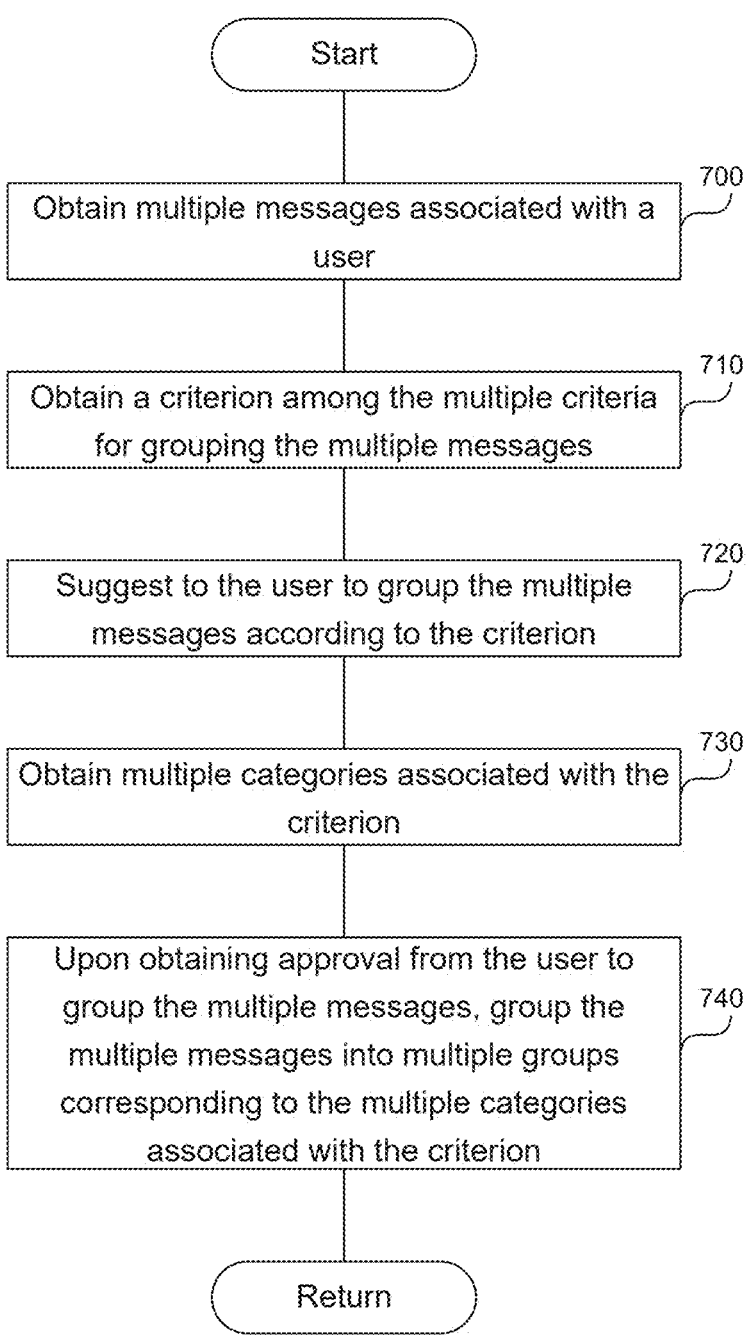
FIG. 7 is a flowchart of a method to analyze content of received emails to sort emails in a user's inbox.

FIG. 7 is a flowchart of a method to analyze content of received emails to sort emails in a user's inbox. A hardware or software processor executing instructions described in this application can, in step 700, obtain multiple messages associated with a user. In step 710, the processor can obtain a criterion among the multiple criteria for grouping the multiple messages. The multiple criteria can include a tone associated with a message among the multiple messages, a feeling associated with the message among the multiple messages, an attitude associated with the message among the multiple messages, an attachment associated with the message among the multiple messages, a meeting, a to-do item, a contact, or an event. The event can be an external event, such as an event available to the public. Prior to proceeding, the processor can check whether the criterion grouping is beneficial—e.g., whether the grouping creates at least one group having more than one message in the group, where the one group is distinct from the remainder of the multiple messages.

In step 720, upon determining that the grouping is beneficial, the processor can suggest to the user to group the multiple messages according to the criterion. In step 730, the processor can obtain multiple categories associated with the criterion. In step 740, upon obtaining approval from the user to group the multiple messages, the processor can group the multiple messages into multiple groups corresponding to the multiple categories associated with the criterion.

The processor can obtain the criterion among the multiple criteria for grouping the multiple messages, where the criterion includes the tone and/or the feeling. The tone associated with the message includes an implicit feeling expressed by the message. The feeling associated with the message includes an explicitly expressed feeling. The processor can obtain the multiple categories associated with the criterion, where the multiple categories include positive, neutral, and negative. Upon obtaining the approval from the user to group the multiple messages, the processor can analyze, using AI, the multiple messages to group the multiple messages into the multiple groups.

The processor can obtain the criterion among the multiple criteria for grouping the multiple messages, where the criterion includes the attitude. The attitude can include a pattern of behavior expressed over a first multiplicity of messages associated with the user. Attitude can be "my team is the best." The processor can obtain the multiple categories associated with the criterion, where the multiple categories include positive, neutral, and negative. The processor can obtain a subset of messages among the multiple messages, where the multiple messages include multiple subsets of messages and where the subset of messages corresponds to a single topic, such as the subject line, or the same group of sender and recipient(s). The processor can analyze, using AI, the subset of messages to determine the attitude associated with the subset of messages. The attitude can be positive, neutral, and negative. Upon obtaining the approval from the user to group the multiple messages, the processor can group the multiple subsets of messages into the multiple groups.

The processor can obtain the criterion among the multiple criteria for grouping the multiple messages, where the criterion includes a first attachment and a second attachment. The processor can obtain, using AI, a first content of the first attachment and second content of the second attachment. To obtain the content, the processor can create the first and second summary of the first and second attachment, respectively. Based on the first and second summary, the processor can create a first and second embedding vector of the first and second summary, respectively. The processor can obtain the multiple categories associated with the criterion by, based on the first content and the second content, determining a first group of messages whose content is related to the first content of the first attachment and a second group of messages whose content is related to the second content of the second attachment, where the multiple categories correspond to the first attachment in the second attachment.

To determine the first group of messages and the second group of messages, the processor can create a summary of each message among the multiple messages and create an embedding vector for each message. The processor can compare the distance between the embedding vector of each message and the first and second embedding vectors. The smaller the distance between two embedding vectors, the more similar the two summaries are. The distance can be measured in various ways, such as cosine similarity. When the distance between the embedding vectors is below a predetermined threshold, such as 0.7 in cosine similarity, the processor can determine that the two vectors are related. If the distance between the embedding vector representing summary of the message and both the first embedding vector and the second embedding vector are below the predetermined threshold, the processor can determine which of the first or second embedding vectors is closer to the embedding vector representing summary of the email. The processor can group the message in the group with the smaller distance to the embedding vector representing summary of the message. Upon obtaining the approval from the user to group the multiple messages, the processor can group the multiple messages into the first group and the second group.

The processor can obtain the criterion among the multiple criteria for grouping the multiple messages, where the criterion includes a first meeting and a second meeting. The meeting can be a calendar meeting. The processor can obtain a first indication of content associated with the first meeting and a second indication of content associated with the second meeting, where the first indication of content includes an agenda, a title associated with the first meeting, and/or invitees associated with the first meeting and second indication of content includes an agenda, a title associated with the second meeting, and/or invitees associated with the second meeting. The processor can obtain the multiple categories associated with the criterion. Specifically, based on the first indication of content and second indication of content, the processor can create a first group of messages whose content is related to the first indication of content associated with the first meeting and a second group of messages whose content is related to the second indication of content associated with the second meeting. Upon obtaining the approval from the user to group the multiple messages, the processor can group the multiple messages into the first group and the second group. To determine relatedness, the processor can embed the agenda, title, and/or invitees of the meeting into an embedding vector and summary of emails into respective embedding vectors. The processor can then compare embedding vector representing content of the meeting and the embedding vectors representing summary of emails as described in this application.

The processor can obtain the criterion among the multiple criteria for grouping the multiple messages, where the criterion includes a first task and a second task. Tasks can be from a to-do list. The processor can obtain the multiple categories associated with the criterion by determining a first group of messages whose content is related to the first task and a second group of messages whose content is related to the second task. Upon obtaining the approval from the user to group the multiple messages, the processor can group the multiple messages into the first group and the second group. To determine relatedness, the processor can embed the text describing the task into an embedding vector and summary of emails into respective embedding vectors. The processor can then compare embedding vector representing content of task and the embedding vectors representing summary of emails as described in this application.

The processor can obtain the criterion among the multiple criteria for grouping the multiple messages, where the criterion includes a contact. The contact can include name, email address, phone number, physical address, pretty good privacy (PGP) public key, and/or geographic location. The processor can obtain the multiple categories associated with the criterion. Specifically, based on the contact, the processor can determine a group of messages whose sender or recipient matches the contact by, for example, determining whether the email address, name, phone number, physical address, PGP public key, and/or geographic location match. Upon obtaining the approval from the user to group the multiple messages, the processor can group the multiple messages into the group and a remainder of the multiple messages.

The processor can obtain the criterion among the multiple criteria for grouping the multiple messages, where the criterion includes the event. The processor can obtain from a database, e.g., the Internet, information about the event, including a summary, title, and/or a location. Based on the information about the event, the processor can determine a group of messages whose content is related to the event. Upon obtaining the approval from the user to group the multiple messages, the processor can group the multiple messages into the group of messages whose content is related to the event and a remainder of the multiple messages, where the remainder of the multiple messages is not related to the event. To determine related messages, in one embodiment, the processor can search messages for a mention of the event title. In another embodiment, the processor can create an embedding vector of the summary and/or the title of the event. The processor can also summarize each email and create an embedding vector of the message summary. The processor can compare the distance between the embedding vector associated with events and the embedding vectors associated with the messages to determine whether the distance between them is below a predetermined threshold, as described in this application. If the distance is below the predetermined threshold, the processor can determine that the message is related to the event.

The processor can start the multiple categories by relevance and age, where the more recent categories show higher up in the list of categories. Specifically, the processor can iterate over a group of messages among the multiple groups of messages to determine a most recent message in each group of messages. The processor can sort the multiple groups of messages according to the most recent message in each group among the multiple groups of messages. The sorting can be from most recent to least recent.

Figure 8:
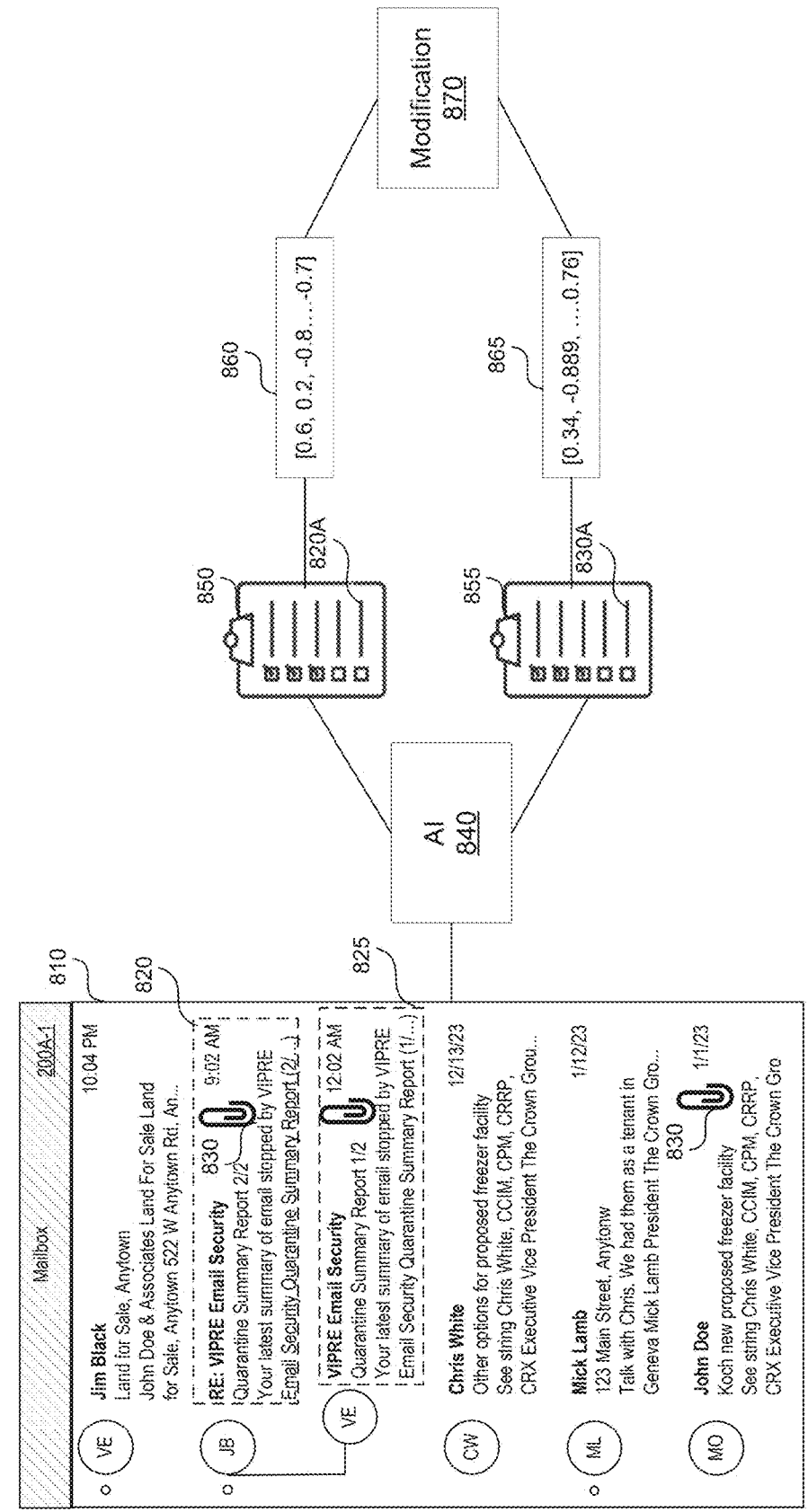
FIG. 8 shows a system to respond to emails by analyzing the attachments in emails received, or about to be sent, to suggest more contextually appropriate responses.

Responding to Emails by Analyzing the Attachments in Emails Received, or about to be Sent, to Suggest More Contextually Appropriate Responses FIG. 8 shows a system to respond to emails by analyzing the attachments in emails received, or about to be sent, to suggest more contextually appropriate responses. The system 800 can obtain an email message 820 from multiple email messages 810 and an attachment 830 associated with the email message. The attachment 830 can be included in the email message 820, or the attachment can be included in a previous email message 825 to which the email message is responding.

The AI 840, part of the system 800, can create a summary 850 of the email message 820 and a summary 855 of the attachment 830. The summary 850 of the email message 820 can include a first statement 820A, and the summary 855 of the attachment 830 can include a second statement 830A. The summary 850, 855 can include a single statement or multiple statements. The summary 850, 855 can be an outline.

The AI 840 can create a first embedding vector 860 representing the first statement 820A and a second embedding vector 865 representing the second statement 830A. The AI 840 can create multiple embedding vectors representing each of the multiple statements in the summaries 850, 855. The first embedding vector 860 and second embedding vector 865 can be numerical vectors in multidimensional space.

The system 800 can determine whether the first statement 820A and the second statement 830A are related. To determine relatedness, the system 800 can determine a distance between the first embedding vector and the second embedding vector in the multidimensional space. The distance can be calculated using either Manhattan, Euclidean, or cosine distance, also known as cosine similarity. With large-dimensional vectors, cosine distance is preferred because Manhattan and Euclidean distances can become too large. The system 800 can determine whether the first statement 820A and the second statement 830A are related by comparing the distance to a predetermined threshold. For example, when the distance is measured as cosine distance, the system 800 can compare the distance to the predetermined threshold of 0.7. If the distance is equal to or above the predetermined threshold, the system 800 can determine that the first and second statement 820A, 830A are related.

Upon determining that the first and second statement 820A, 830A are related, the system 800 can determine, using AI 840, whether the email message 820 addresses the second statement 830A associated with the attachment 830. For example, if the second statement 830A is a question, the AI 840 can determine whether the first statement 820A provides an answer to the question. In another example, if the second statement 830A is a statement of fact, the AI 840 can determine whether the first statement 820A includes an accurate representation of the fact(s).

Upon determining that the email message 820 does not address the second statement 830A, the AI 840 can generate, based on the email message and the second statement, a modification 870 to the email message, where the modification addresses the second statement associated with the attachment. That way, the system 800 can ensure the email message 820 has addressed all the relevant information in the attachment 830.

For example, the first statement 820A can say, "The PSAT range for national merit semifinalist is in the high end of the scoring spectrum." The second statement 830A can say, "The PSAT range for national merit semifinalist in California in the last few years was 1470-1520 in 2023, 1480-1520 in 2022, and 1480-1520 in 2021." After the system determines that the first statement 820A is related to the second statement 830A, the system can modify the first statement 820A to be more accurate by stating, "The PSAT range for national merit semifinalist in California in the last few years started at 1470" or "the PSAT range for national merit semifinalist in California in the last few years was 1470-1520 in 2023, 1480-1520 in 2022, and 1480-1520 in 2021."

Figure 9A:
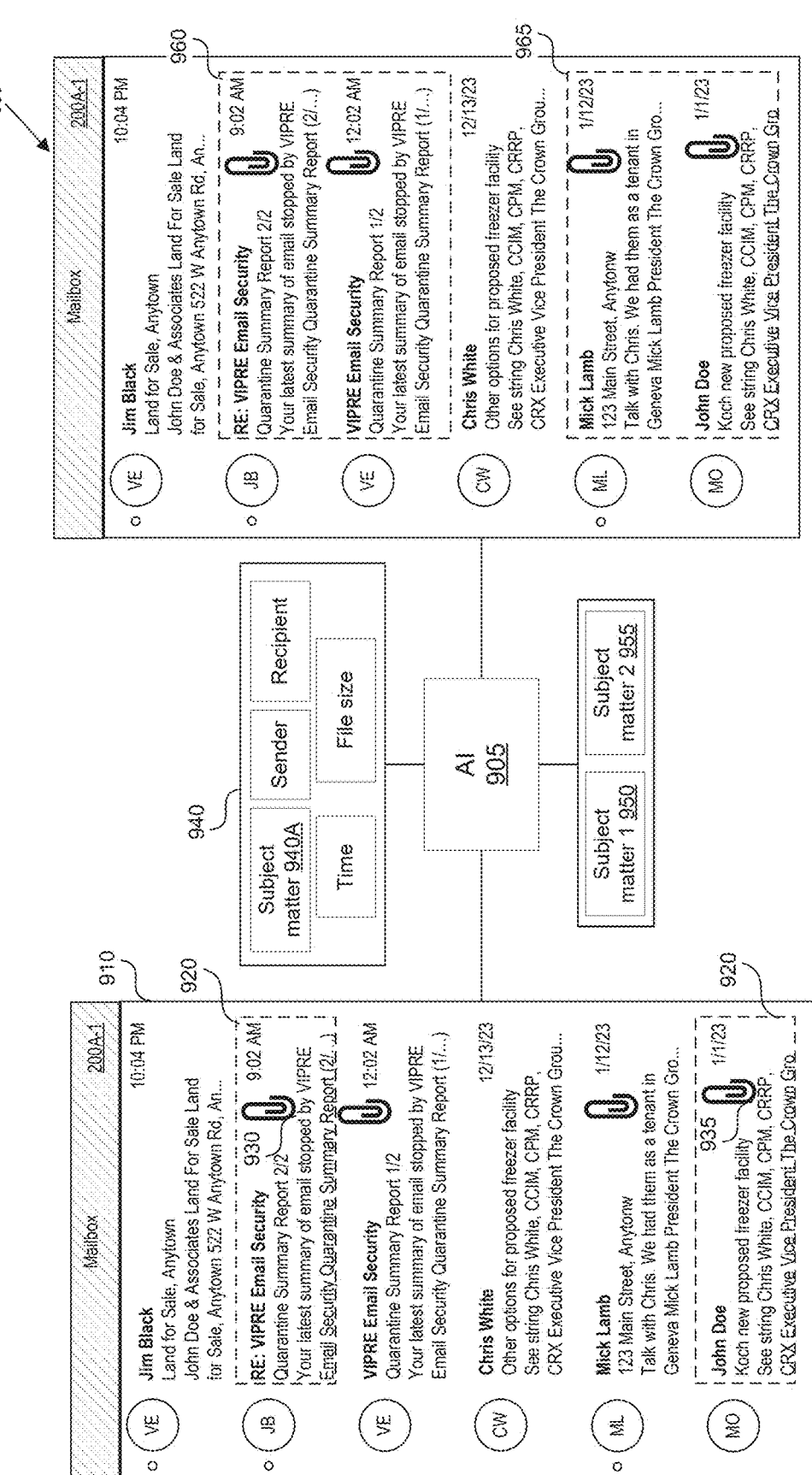
FIGS. 9A-9B show a system to group received and sent attachments by various criteria and to analyze the resulting grouping.
Figure 9B:
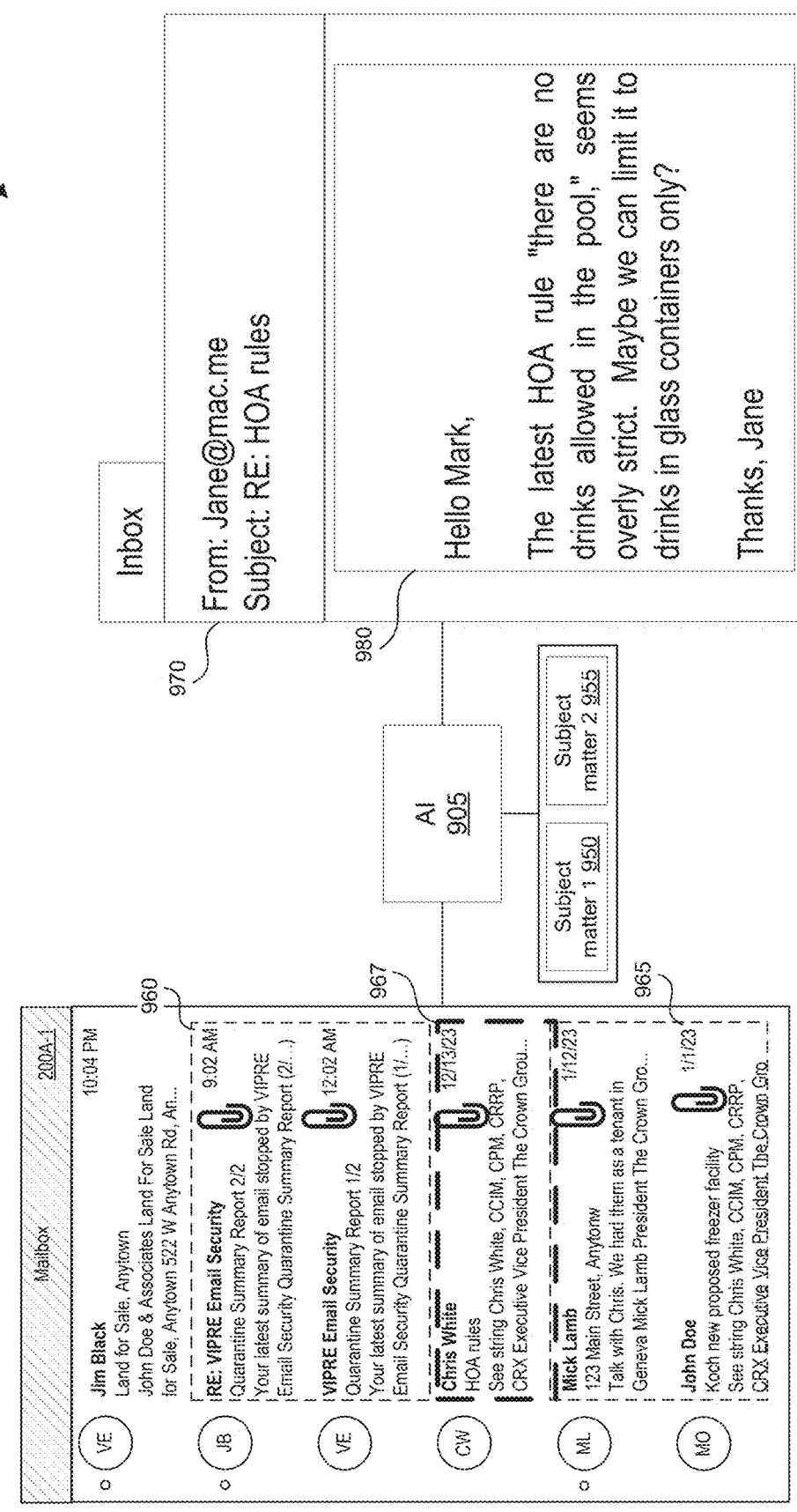

FIGS. 9A-9B show a system to group received and sent attachments by various criteria and to analyze the resulting grouping. The system 900 can obtain a first multiplicity 910 of email messages and extract from the first multiplicity of email messages the second multiplicity 920 of email messages, where each email message among the second multiplicity of email messages includes at least one attachment 930, 935. Thereby, the system 900 obtains multiple attachments 930, 935 associated with the second multiplicity 920 of email messages.

The system 900 can obtain a criterion 940A among multiple criteria 940, according to which to sort the second multiplicity 920 of email messages. The criteria 940A can be associated with the attachment 930, 935 and can include subject matter, sender, recipient, time, file size, and/or file type.

For example, if the criteria 940A is subject matter, the system 900 can obtain multiple subject matters 950, 955 associated with the multiple attachments 930, 935. For example, in FIGS. 9A-9B, the subject matter 950, corresponding to the attachment 930, can be email security, while the subject matter 955, corresponding to the attachment 935, can be freezer facility.

To obtain the multiple subject matters 950, 955, the system 900 can, using AI 905, create a summary of each of the multiple attachments 930, 935 and can create an embedding vector for each of the multiple attachments. If the embedding vector of two attachments is within a predetermined threshold, such as 0.9 in cosine similarity, the two embedding vectors are considered to be the same, and an average embedding vector can be computed to replace the two embedding vectors.

The system 900 can group the second multiplicity 920 of email messages according to the multiple subject matters 950, 955 to obtain multiple groups 960, 965 of email messages. A group 960, 965 of email messages among the multiple groups of email messages corresponds to a subject matter 950, 955, respectively. The group 960, 965 can be an email folder. To determine which email message corresponds to which subject matter 950, 955 and, consequently, which group 960, 965, the system 900 can create a summary of each email and an embedding vector of the summary of each email. The system 900 can determine the closest distance between the embedding vector of the summary of each email and the embedding vector of the multiple subject matters 950, 955. The email message belongs to the group of the embedding vector representing a subject matter 950, 955 that has the closest distance to the embedding vector of the email summary.

Based on the summary of the email message and the multiple subject matters 950, 955, the system 900 can determine a matching subject matter among the multiple subject matters that matches the summary of the email message 970 that is currently being drafted. The matching subject matter can be the closest match of the multiple subject matters based on the distance between the embedding vectors, as described above. The system 900 can obtain a matching group 967 of email messages among the multiple groups 960, 965 of email messages, where the matching group of email messages corresponds to the matching subject matter. Based on the matching group 967 of email messages and email message 970, the system 900 can suggest content 980 to include in the email message. The content 980 can be text or multimedia.

For example, if the email message 970 refers to a rule in the homeowner association rules, the system 900 can group the email messages according to the attachment, where one group of the email messages includes all the emails containing attachments including homeowner association rules. The email attachments can include various progressive revisions of the homeowner association rules. The system 900 can then analyze the various progressive revisions of the homeowner association rules to find the most updated version of the rule to which the email message 970 refers and can provide the text of the most updated version of the rule in the email message.

Figure 10:
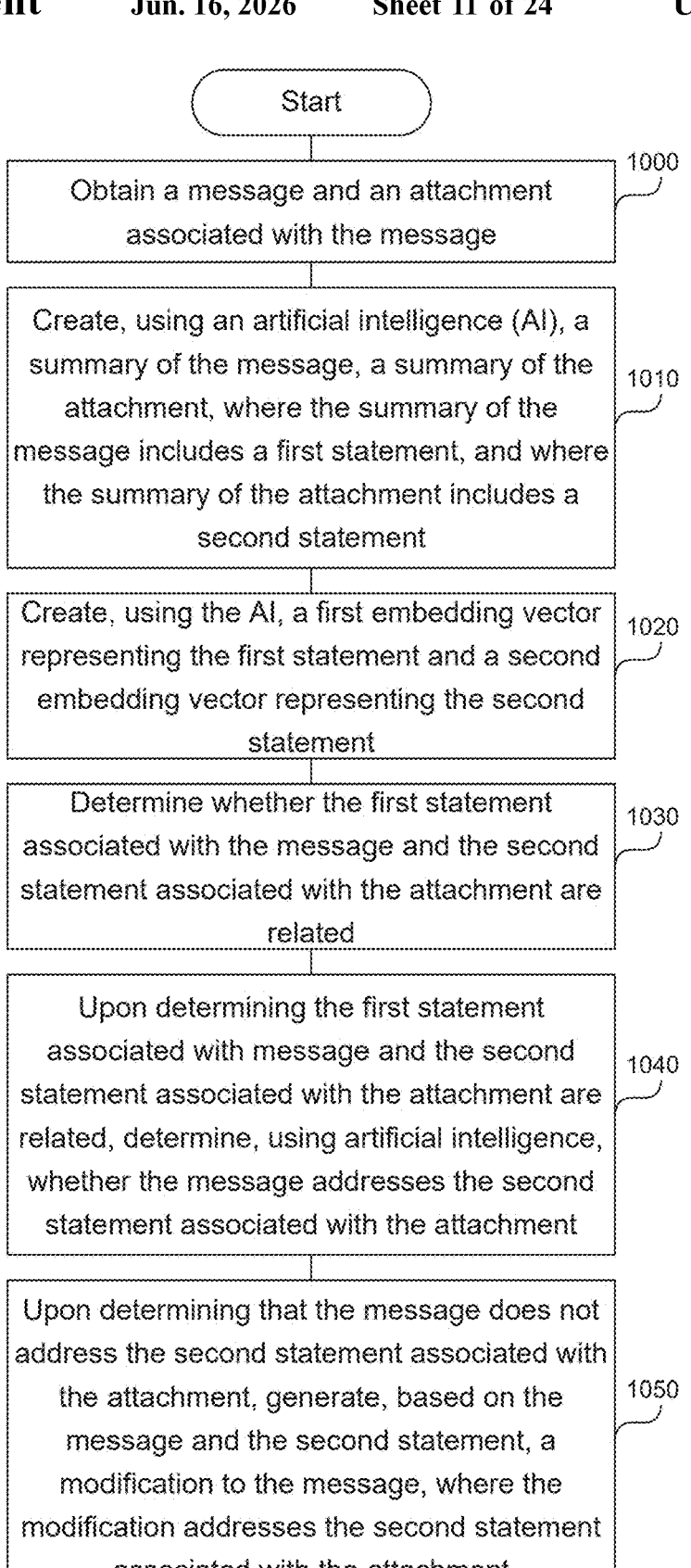
FIG. 10 is a flowchart of a method to respond to emails by analyzing the attachments in emails received, or about to be sent, to suggest more contextually appropriate responses.

FIG. 10 is a flowchart of a method to respond to emails by analyzing the attachments in emails received, or about to be sent, to suggest more contextually appropriate responses. A hardware or software processor executing instructions described in this application can, in step 1000, obtain a message and an attachment associated with the message. The attachment can be included in the message, or the attachment can be included in a previous message to which the message is responding. The message can include any type of digital communication, such as text, image, voice, and/or multimedia.

In step 1010, the processor can create, using an artificial intelligence (AI), a summary of the message and a summary of the attachment, where the summary of the message includes a first statement and the summary of the attachment includes a second statement. The summary can be a single statement or multiple statements, such as an outline.

In step 1020, the processor can create, using the AI, a first embedding vector representing the first statement and a second embedding vector representing the second statement, as described in this application.

In step 1030, the processor can determine whether the first statement associated with the message and the second statement associated with the attachment are related by performing the following steps. First, the processor can determine a distance between the first embedding vector and the second embedding vector in the multidimensional space. Second, the processor can determine whether the first statement and the second statement are related by comparing the distance to a predetermined threshold. For example, when the distance is measured in cosine similarity, the predetermined threshold can be 0.7. If the distance between the two embedding vectors is above the predetermined threshold, the processor can determine that the two embedding vectors are related.

In step 1040, upon determining that the first statement associated with the message and the second statement associated with the attachment are related, the processor can determine, using AI, whether the message addresses the second statement associated with the attachment. For example, if the second statement is a question, the processor can determine whether the first statement is a response to the question in the second statement. In another example, if the second statement is a statement of fact, the processor can determine whether an indication of the fact occurs in the first statement.

In step 1050, upon determining that the message does not address the second statement associated with the attachment, the processor can generate, using AI, based on the message and the second statement, a modification to the message. The modification to the message can address the second statement and can ensure the user's response has addressed all the relevant information in the sender's attached file. The processor can suggest points to make to address all relevant information. If the processor determines that the message addresses the second statement, the processor can avoid generating the modification.

The processor, using AI, can analyze the content of a new email or a response the user is sending to ensure the text is correct based on the information in attachments the user will send or attachments the user received. The processor can obtain content of the message and content of the attachment associated with the message, where the content of the message is being drafted. The processor can determine, using the AI, whether the content of the message is contradictory to the content of the attachment associated with the message. To determine the contradiction, the processor can represent the content of the message and the content of the attachment using one or more embedding vectors. The processor can determine the distance between the two groups of embedding vectors. If the distance between the two groups of embedding vectors is less than a predetermined threshold, such as 0, the processor can determine that the message and the attachment are contradictory. Upon determining that the content of the message is contradictory to the content of the attachment, the processor can suggest, using the AI, a change to the content of the message, where the change is consistent with the content of the attachment.

The processor, using the AI, can sort received and sent attachments by subject matter, sender, recipient, time, file size, and file type. The type can be file type and include pdf, Excel, and various multimedia file types. In addition, the processor can, where appropriate, sort the files by content properties including aspect ratio, resolution, etc. The processor can obtain a first multiplicity of messages including the message and extract from the first multiplicity of messages the second multiplicity of messages, where each message among the second multiplicity of messages includes at least one attachment. In this way, the processor obtains multiple attachments associated with the second multiplicity of messages. The processor can obtain a criterion among multiple criteria associated with the multiple attachments, where the multiple criteria include a subject matter, sender, recipient, time, time period, attachment size, and attachment type. The attachment type can be the file type of the attachment. The processor can sort the second multiplicity of messages according to the criterion.

Once the attachments are grouped by subject matter, the processor, using the AI, can analyze the written response and identify a group of attachments directed to the relevant subject matter. The AI can analyze the group of attachments directed to the relevant subject matter and suggest modification of the response based on the analysis of the attachments. The processor can obtain a first multiplicity of messages and extract from the first multiplicity of messages the second multiplicity of messages, where each message among the second multiplicity of messages includes at least one attachment. This way, the processor can obtain multiple attachments associated with the second multiplicity of messages. The processor can obtain multiple subject matters associated with the multiple attachments and create corresponding embedding vectors. The processor can group the second multiplicity of messages according to the multiple subject matters associated with the multiple attachments to obtain multiple groups of messages, where a group of messages among the multiple groups of messages corresponds to a subject matter among the multiple subject matters. Based on the summary of the message and the multiple subject matters associated with the multiple attachments, the processor can determine a matching subject matter among the multiple subject matters that matches the summary of the message. As explained in this application, the processor can use embedding vectors to determine the closest match among the multiple subject matters based on the distance between the embedding vector representing the summary of the message and the embedding vector representing the subject matter associated with the group of messages. The processor can obtain a matching group of messages among the multiple groups of messages, where the matching group of messages corresponds to the matching subject matter. Based on the matching group of messages and message, the processor can suggest content to include in the message. The content can be text or multimedia.

The processor, using the AI, can sort received and sent attachments by subject matter, sender, recipient, time, time period, file size, and file type, such as pdf, Excel, jpg, etc. The processor can create folders including sorted attachments. The processor can obtain a first multiplicity of messages including the message. The processor can extract from the first multiplicity of messages the second multiplicity of messages, where each message among the second multiplicity of messages includes at least one attachment, thereby obtaining multiple attachments associated with the second multiplicity of messages. The processor can obtain a criterion among multiple criteria associated with the multiple attachments, where the multiple criteria include a subject matter, sender, recipient, time, attachment size, and attachment type. The processor can group the second multiplicity of messages according to the criterion to obtain multiple groups of messages. If the criterion is attachment size or time, the processor can group the messages by size or time ranges. If attachment is file type, the processor can group the messages by attachment file formats, such as pdf, Excel, PowerPoint, comma-separated values, tiff, etc. The processor can create multiple folders, where a folder among the multiple folders includes a group of messages among the multiple groups of messages.

The processor, using the AI, can analyze the emotive content of the attachments, e.g., by tone, feeling, and attitude, and can suggest the appropriate response or changes to the current response. For example, if the email is from the HOA and includes a pdf about not taking drinks into the pool, and the initial response from the recipient is angry, the AI can suggest a change of tone from angry to rational. The processor can obtain a message and an attachment associated with the message, where the message includes a recipient. The processor can analyze, using the AI, a tone, a feeling, and an attitude associated with the attachment and user message, where the tone includes an implicit feeling expressed by the message, the feeling includes an explicitly expressed feeling, and the attitude includes a pattern of behavior expressed over a first multiplicity of messages associated with a user. The processor can determine, using the AI, an effect of the message on the recipient. The AI can determine the effect of the message on the recipient based on the tone, the feeling, and the attitude associated with the attachment and the message, as described in this application. The effect includes a positive effect, a neutral effect, and a negative effect. The processor can suggest, in response to the determined effect being a negative effect associated with the recipient, a modification to the message, where the effect of the modification on the recipient excludes the negative effect.

Figure 11:
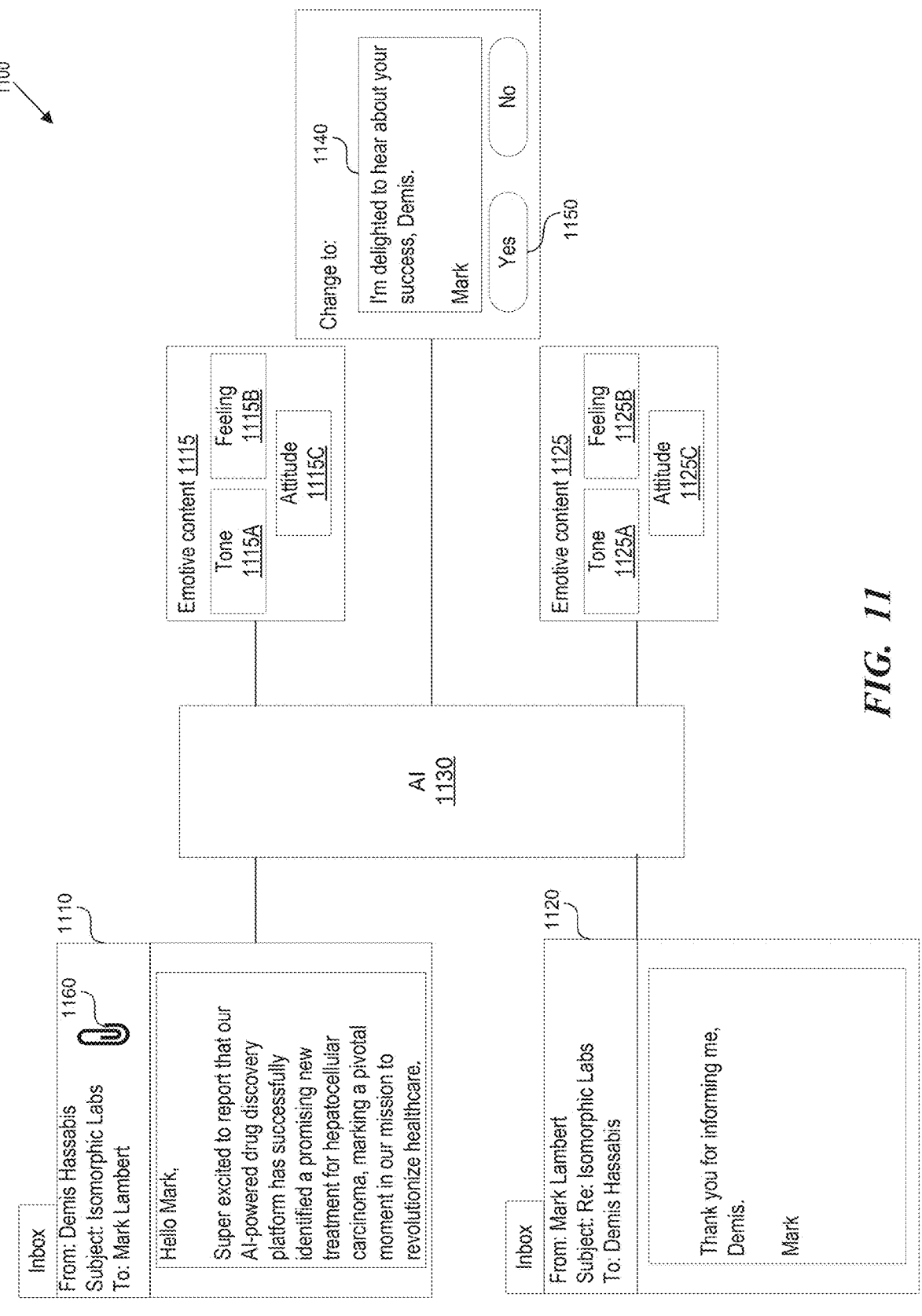
FIG. 11 shows a system to respond to messages by analyzing the emotive content of received emails.

Responding to Messages by Analyzing the Emotive Content of Received Emails to Suggest More Contextually Appropriate and Emotionally Resonant Responses FIG. 11 shows a system to respond to messages by analyzing the emotive content of received emails. The system 1100 can obtain a first message 1110 and a second message 1120, where the second email is a response to the first message. The messages 1110, 1120 can be text messages, voice messages, images, videos, multimedia messages, etc.

The system 1100 can analyze, using artificial intelligence (AI) 1130, the first message 1110 and the second message 1120 to obtain a first emotive content 1115 and second emotive content 1125 associated with the first and second message, respectively, where the first emotive content includes a first tone 1115A, a first feeling 1115B, and a first attitude 1115C and where the second emotive content includes a second tone 1125A, a second feeling 1125B, and a second attitude 1125C.

A tone can be an implicit feeling expressed by the first and second messages, respectively. The tone can be positive, negative, or neutral. For example, the statement "If you had only been there" includes a positive tone, e.g., an implied positive feeling. In another example, the tone can be negative, such as "I wanted to take a moment to acknowledge the effort put into the recent project. It's clear that everyone worked very hard, even if the final results didn't quite meet our expectations," exemplifying an implied negative feeling. In a third example, the tone can be neutral, such as "As we wrap up the current project, I wanted to highlight a few observations. There were several areas where we performed well, and some where we encountered challenges. Moving forward, it would be beneficial to analyze these aspects to enhance our efficiency and effectiveness," exemplifying an implied neutral feeling.

A feeling can be explicitly expressed. The feeling can be positive, negative, or neutral. For example, the statement "I really like you" expresses a positive feeling. In another example, the following statement expresses negative feelings: "I'm really frustrated with the lack of progress on the project." In a third example, the following statement expresses neutral feelings: "Just a reminder that our meeting is scheduled for 2 PM today in the conference room."

An attitude can be a pattern of behavior expressed over multiple messages. The attitude can be positive, negative, or neutral. A positive attitude expressed over multiple messages can be a statement such as "My team is the best." A negative attitude expressed over multiple messages can be a statement such as "We have failed again." A neutral attitude expressed over multiple messages can be a statement such as "We need to keep trying."

The system 1100 can determine whether the second tone 1125A, the second feeling 1125B, and the second attitude 1125C match the first tone 1115A, the first feeling 1115B, and the first attitude 1115C, respectively. To make the determination, the system can match the two tones 1115A, 1125A, the two feelings 1115B, 1125B, and the two attitudes 1115C, 1125C, respectively. If there is a mismatch in at least one of the pairs, the system 1100 can determine that the second tone 1125A, the second feeling 1125B, and the second attitude 1125C match the first tone 1115A, the first feeling 1115B, and the first attitude 1115C, respectively. For example, the second tone 1125A, the second feeling 1125B, and the second attitude 1125C can be negative, positive, and neutral, respectively, while the first tone 1115A, the first feeling 1115B, and the first attitude 1115C can be positive, positive, and neutral, respectively. Consequently, the system 1100 can determine that there is no match.

Upon determining that the second tone 1125A, the second feeling 1125B, and the second attitude 1125C do not match the first tone 1115A, the first feeling 1115B, and the first attitude 1115C, the system 1100 can suggest a change 1140 to the second message 1120, where the change to the second message causes the second tone, the second feeling, and the second attitude to match the first tone, the first feeling, and the first attitude, respectively.

The system 1100 can receive an approval 1150 of the change 1140. Upon receiving the approval, the system 1100 can make the change 1140 to the second message 1120.

For example, if the first message 1110 expresses a feeling of happiness, but the second message 1120 is neutral, the system 1100 can suggest the change 1140, such as "I'm delighted to hear about your success" instead of "Thank you for informing me." In another example, if multiple messages including the second message 1120 have expressed a consistently positive attitude such as "The project is progressing" and that attitude does not reflect reality, the system 1100 can suggest the change 1140 such as "While the project is moving forward, we've identified several areas that require immediate improvement." In a third example, if the original email is factual and neutral, but the response is overly emotional, the system 1100 can suggest the change 1140, such as "I acknowledge the new policy and will ensure its implementation" instead of "I'm thrilled about the new policy."

In addition, the AI 1130 can obtain an attachment 1160 included in the first email message, where the attachment can be text, image, voice, video, binary, etc. The AI 1130 can analyze the first email message 1110 and the attachment 1160 to determine the first emotive content 1115 associated with the first email message.

Figure 12:
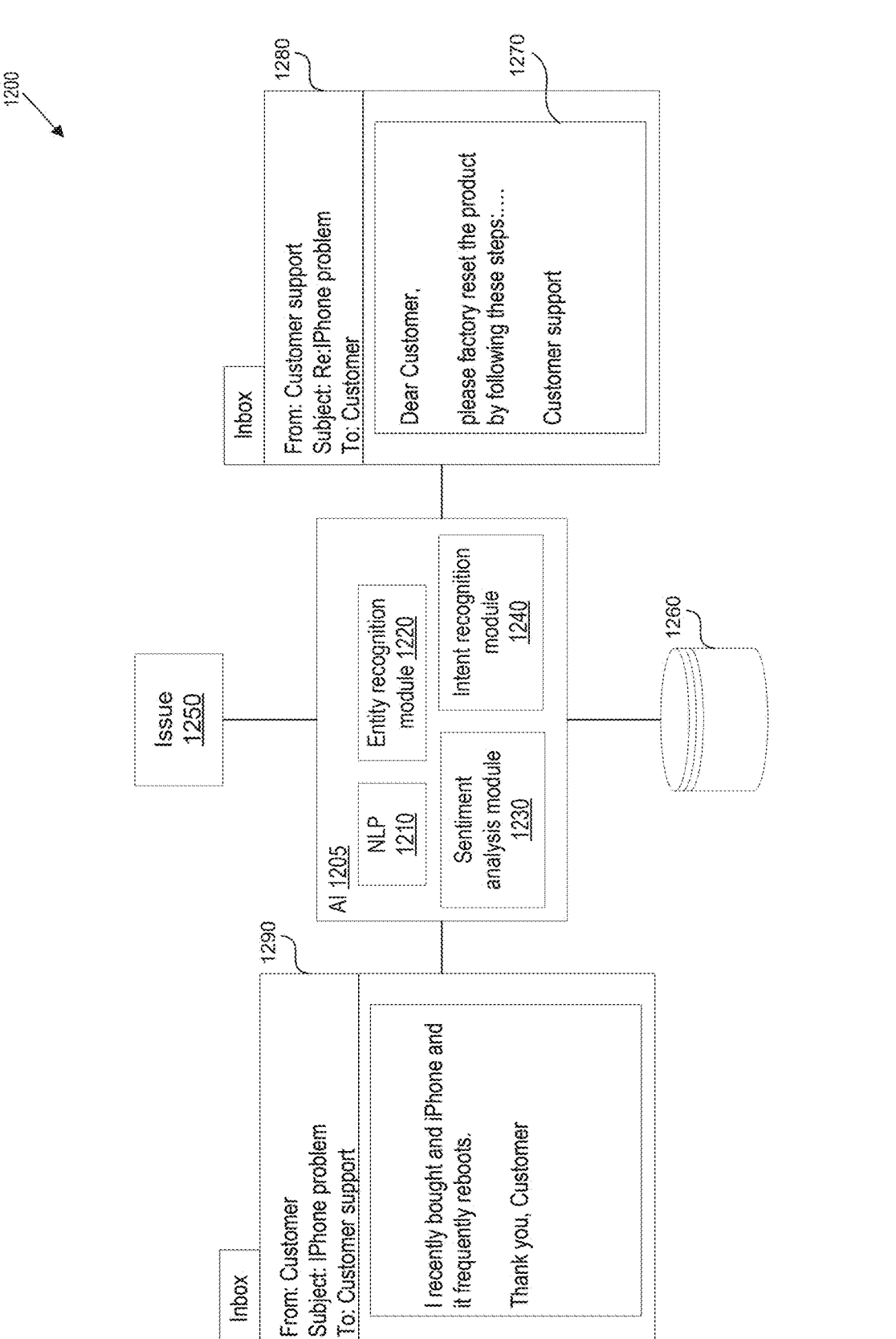
FIG. 12 shows a system to identify an issue in a message and suggest resolutions.

FIG. 12 shows a system to identify an issue in a message and suggest resolutions. The system 1200 includes a Natural Language Processing (NLP) module 1210, entity recognition module 1220, sentiment analysis module 1230, and intent recognition module 1240, all of which can be part of an AI 1205. The NLP module 1210 can preprocess the text of the message 1290, which includes cleaning the message by removing stop words and punctuation and performing tokenization by breaking down text into individual words or phrases. Entity recognition module 1220 can identify key entities such as names, dates, and specific terms related to the issue 1250. Sentiment analysis module 1230 can determine the sentiment of the message 1290 to understand the emotive content 1115 in FIG. 11 and urgency of the issue 1250, while intent recognition module 1240 can understand the purpose or intent behind the message, such as a complaint, request, or inquiry.

The modules 1210, 1220, 1230, 1240 can be trained to classify and predict issues based on historical message data. This involves using a labeled dataset of messages where issues and resolutions are already identified. Relevant features are extracted from the message to help in identifying the issue, and a machine learning model (e.g., Support Vector Machines, Neural Networks) is trained to classify messages into different issue categories. The trained AI 1205 including modules 1210, 1220, 1230, 1240 is then used to determine the issue 1250 in new messages.

Once the system 1200 identifies the issue 1250, the next step is to search for a resolution by querying a database 1260, such as an internal database or the Internet, that contains information on how similar issues were resolved. The system 1200 can formulate a natural language query based on the identified issue 1250, searching an internal database or the Internet for relevant information or past resolutions and retrieving the most relevant information that can help in resolving the issue 1250.

Finally, the system 1200 can generate a response message 1280 that includes a reference to the resolution 1270. The system 1200 can choose an appropriate message template based on the type of issue and use AI 1205 to generate the content of the message 1280, including the resolution 1270 reference, and personalize the email to address the specific needs and context of the recipient.

For example, an email 1290 is received with a customer complaint about a product malfunction. AI 1205 analyzes the email using NLP module 1210 to identify the issue 1250, such as "product not working." AI 1205 then formulates a query to search the database for similar issues and their resolutions. The database search finds a resolution 1270, such as, "Reset the product by following these steps . . . ." AI 1205 generates a response email 1280 that includes the resolution steps and sends it to the customer.

By leveraging NLP, machine learning, and database search techniques, AI 1205 can effectively analyze messages to identify issues and suggest appropriate resolutions, thereby improving efficiency and customer satisfaction.

Figure 13:
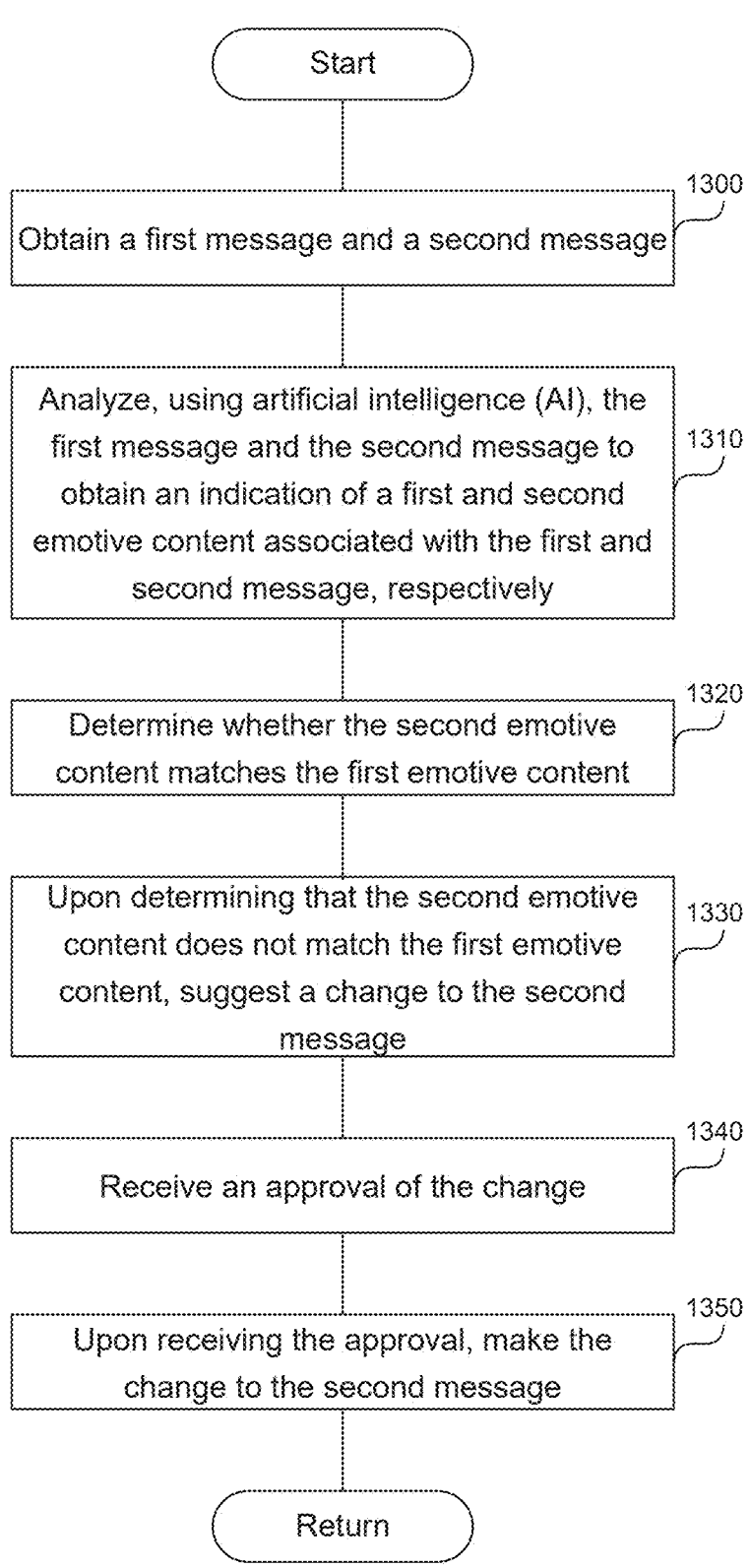
FIG. 13 is a flowchart of a method to respond to messages by analyzing the emotive content of received emails to suggest more contextually appropriate and emotionally resonant responses.

FIG. 13 is a flowchart of a method to respond to messages by analyzing the emotive content of received emails to suggest more contextually appropriate and emotionally resonant responses. A hardware or software processor executing instructions described in this application can, in step 1300, obtain a first message and a second message, where the second message is a response to the first message.

In step 1310, the processor can analyze, using AI, the first message and the second message to obtain an indication of a first and second emotive content associated with the first and second message, respectively. The first and second emotive content can correspond to a category among multiple categories including positive, negative, and neutral. The first emotive content can include a first tone, a first feeling, and a first attitude, while the second emotive content can include a second tone, a second feeling, and a second attitude. The first and second tones can include an implicit feeling expressed by the first and second messages, respectively. The first and second feelings can include an explicitly expressed feeling by the first and second messages, respectively, and the first and second attitudes can include a pattern of behavior expressed over multiple messages.

In step 1320, the processor can determine whether the second emotive content matches the first emotive content and, in step 1330, upon determining that the second emotive content does not match the first emotive content, can suggest a change to the second message, where the change to the second message can cause the second emotive content to match the first emotive content. In step 1340, the processor can receive an approval of the change and, in step 1350, upon receiving the approval, can make the change to the second message.

The processor can analyze, using artificial intelligence (AI), the first message and the second message to obtain the first tone, the first feeling, and the first attitude associated with the first message and the second tone, the second feeling, and the second attitude associated with the second message. The first and second tones, the first and second feelings, and the first and second attitudes can correspond to a category among multiple categories including positive, negative, and neutral. The processor can determine whether the second tone, the second feeling, and the second attitude match the first tone, the first feeling, and the first attitude by determining whether the category corresponding to the second tone matches the category corresponding to the first tone, whether the category corresponding to the second feeling matches the category corresponding to the first feeling, and whether the category corresponding to the second attitude matches the category corresponding to the first attitude. Upon determining that at least one of these does not match, the processor can provide a suggestion for the change.

The AI can identify emotive content by analyzing interjections, adverbs, adjectives, etc. of the first message. The processor can obtain an interjection, multiple adjectives and multiple adverbs associated with the first message and analyze the first message to obtain the first emotive content by analyzing the interjection, multiple adjectives and multiple adverbs to determine whether the emotive content is positive, negative, or neutral.

The user can suggest to the AI model a response that conforms to a particular emotion, such as tone, feeling, and attitude. For example, the user can tell the AI to return a neutral, positive, negative, happy, angry, etc. response. Specifically, the processor can receive an indication of a tone, a feeling, and/or an attitude to include in the second message and generate the second message according to the indication of the tone, the feeling, and/or the attitude.

The processor can obtain an attachment included in the first message, where the attachment is expressed in a medium among the multiple media including text, image, voice, video, and binary code. The processor can analyze, using AI, the first message and the attachment to obtain the first emotive content associated with the first message.

The processor can receive an indication of a tone, a feeling, and/or an attitude to include in the second message and generate the change to the second message according to the indication of the tone, the feeling, and/or the attitude, where the change can include multimedia content such as image, emoji, video, audio, animated gif, and/or text.

The method can categorize received emails based on emotive content. Specifically, the processor can analyze, using AI, the first message to obtain the first tone, the first feeling, and the first attitude, where the first tone, the first feeling, and the first attitude can correspond to a category among multiple categories including positive, negative, and neutral. The processor can obtain multiple messages including the first message and create multiple groups of messages, where a group of messages among the multiple groups of messages can correspond to a positive, negative, or neutral tone, a positive, negative, or neutral feeling, and/or a positive, negative, or neutral attitude.

The AI model can analyze issues/problems, propose next steps on solutions, and respond with reasoning. Specifically, the processor can analyze, using AI, the first message to obtain an issue that needs to be resolved, where the issue can be expressed as a natural language query. The processor can search a database based on the natural language query to obtain an indication of a resolution and generate the first message to include a reference to the indication of the resolution.

Figure 14:
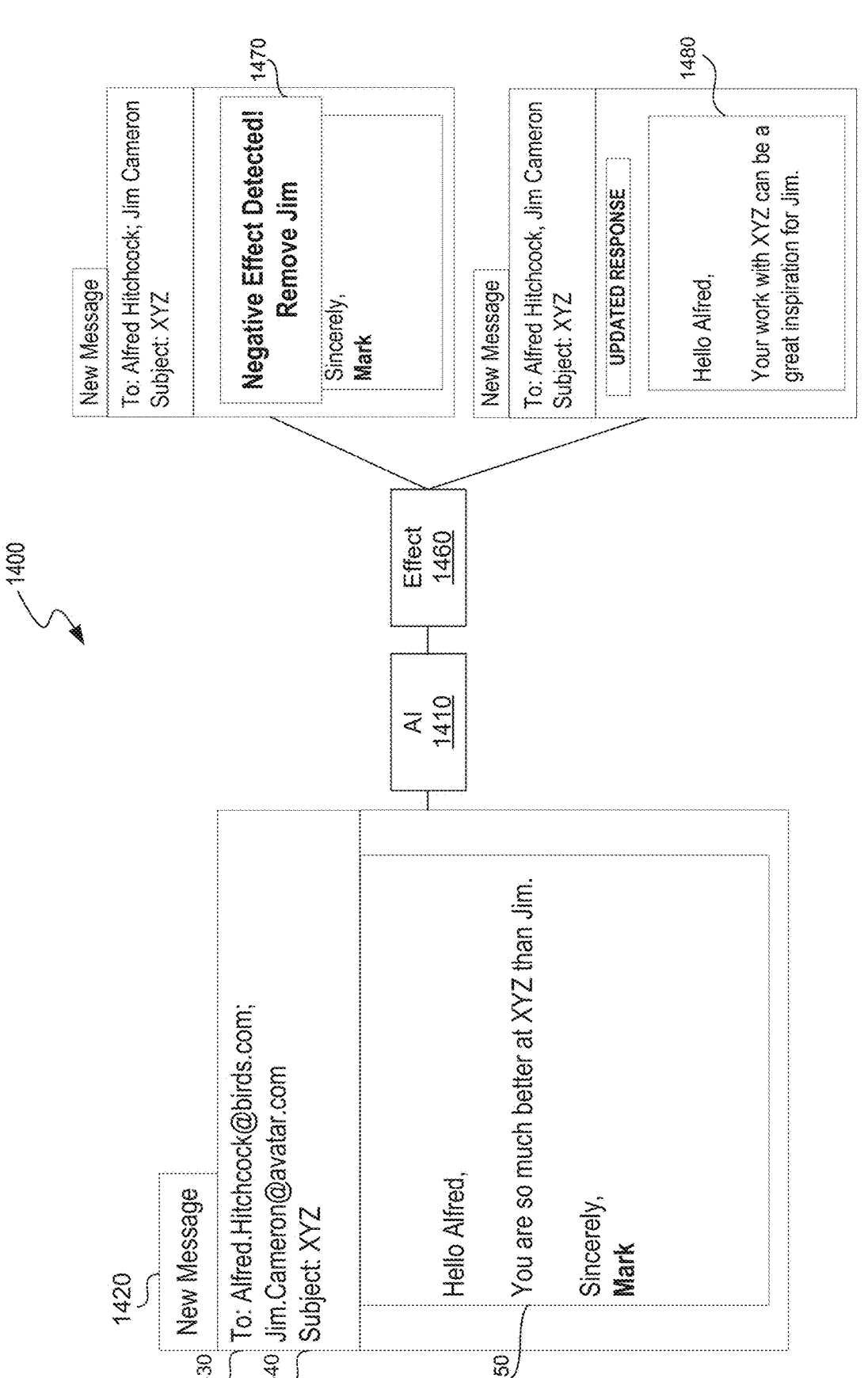
FIG. 14 shows a system where an artificial intelligence (AI) suggests removing a recipient of a digital communication based on the effect of said digital communication on the recipient.

Adding and Removing Recipients of a Digital Communication by Analyzing the Content of Emails Received, or about to be Sent, Based on their Effect FIG. 14 shows a system where an artificial intelligence (AI) suggests removing a recipient of a digital communication based on the effect of said digital communication on the recipient. In the disclosed technology, a digital communication can include emails, voicemails, text messages, and other digital communication mechanisms. The system 1400 includes an AI 1410 that can obtain a message 1420 with recipients 1430, a subject matter 1440, and content 1450. In some embodiments, the message 1420 can have a single recipient 1430. In other embodiments, the message 1420 can have two or more recipients 1430. In some embodiments, the subject matter 1440 can be a topic or topics relevant to the message 1420. For example, an email message about ordering lunch can have the topic "lunch" as the subject matter. In some embodiments, the subject matter 1440 can be only the matter in the subject line of a message (e.g., the subject line of an email). In other embodiments, the subject matter 1440 can be matter discussed in the content 1450 of the message. The content 1450 of the message can include a text (e.g., the text of an email), an audio file of a communication (e.g., a voicemail), emojis, images, gifs, and other communications attachable to an email (e.g., a pdf file).

The AI 1410 can analyze the content 1450 of a message 1420 for a tone, feeling, and attitude associated with the message. The tone associated with the message 1420 can be an implicit feeling expressed by the message 1420. For example, an email sent by a co-worker following up on a project deadline saying "I wanted to check in regarding the status of our current project. I noticed that we are approaching the deadline, and I haven't seen any recent updates. Could you please provide an update on where we stand and if there are any issues we need to address?" may indicate a tone of concern. The feeling associated with the message 1420 can be a feeling explicitly expressed in the message 1420. For example, an email sent by a co-worker thanking the team for their work by saying "I wanted to take a moment to express my gratitude for the incredible effort everyone has put into the recent project" may indicate a feeling of gratitude. The AI 1410 can analyze the content 1450 of a message 1420 in relation to a multiplicity of messages associated with a user to identify an attitude, which can be a pattern of behavior associated with a user. For example, a mentor may consistently email a mentee with offers of support, thanks for their work, and encouragement for the next step, which may indicate that the mentor has a positive and supportive attitude.

The AI 1410 can determine an effect 1460 of the message 1420 on the recipients 1430 based on the tone, feeling, and attitude of the content 1450. In some embodiments, the effect 1460 can be a positive effect, neutral effect, and negative effect. In some embodiments, the message 1420 has a positive effect on recipients 1430 when the message 1420 describes something beneficial, advantageous, or favorable to the recipients 1430. In some embodiments, the message 1420 has a positive effect on recipients 1430 when the message 1420 includes praise, compliments, or other affirmatory language of the recipients. For example, an email message to a recipient saying "Thank you for your hard work" in response to a recipient's project submission can indicate affirmation of the recipient's work and thereby result in a positive effect on the recipient. In some embodiments, the message 1420 has a neutral effect on recipients 1430 when the message 1420 does not impact the recipients 1430 positively or negatively (i.e., the message 1420 is not beneficial or harmful to the recipients 1430). In some embodiments, the message 1420 has a negative effect on recipients 1430 when the message 1420 describes something harmful, disadvantageous, or unfavorable to the recipients 1430. In some embodiments, the message 1420 has a negative effect on recipients 1430 when the message 1420 includes criticism, insults, or other derogatory language to the recipient. For example, an email message to a recipient saying "Your work product is terrible" in response to a recipient's project submission can indicate an insult to the recipient's work and thereby result in a negative effect on the recipient.

In some embodiments, the AI 1410 determines the effect 1460 of a message 1420 by assigning weights and values to the tone, feeling, and attitude of content 1450. The values can be 1, 0, and −1 for positive, neutral, and negative findings. For example, a positive tone gets a value of 1, a neutral tone gets the value of 0, and a negative tone gets a value of −1. For example, a message that says "I think you are amazing" can have a 1 feeling value because the message expresses a positive feeling, whereas a message that says "I think you are terrible" can have a −1 feeling value because the message expresses as a negative feeling.

To determine the weights, the AI can give the most weight to the analyzed feeling since a feeling is something explicitly stated in the message 1420. The AI can give the second most weight to the analyzed tone since tone is something implicit in the message 1420. The AI can give the least weight to the analyzed attitude since attitude is a pattern of behavior not necessarily present in the message 1420. In some embodiments, the AI 1410 can attach a positive or negative weight between 0.4 and 0.6 to the feeling, between 0.2 and 0.4 to the tone, and between 0.0 and 0.2 to the attitude. The feeling weight, the tone weight, and the attitude weight sum up to a constant number such as 1.

In some embodiments, the AI can use Equation 1 below to calculate the effect 1460 by multiplying the weights associated with the tone, feeling, and attitude with the values of the tone, feeling, and attitude extracted from the message.

$$\text{Effect} = (\text{FeelingWeight} * \text{FeelingValue}) + \qquad\qquad \text{Equation 1}$$
$$(\text{Tone Weight} * \text{Tone Value}) +$$
$$(\text{Attitude Weight} * \text{Attitude Value})$$

In some embodiments, the AI can determine a positive effect when Equation 1 results in a value between 0.33 and 1, a neutral effect when the equation results in a value between −0.33 and 0.33, and a negative effect when the equation results in a value between −1 and −0.33.

In some embodiments, the system 1400 can send a notification 1470 that suggests removing one or more of the recipients 1430 of the message 1420 in response to finding that the effect 1460 associated with one or more of the recipients 1430 is a negative effect. For example, if an email has two recipients, Alfred Hitchcock and Jim Cameron, and the message says, "Hello Alfred, You are so much better at XYZ than Jim," the system 1400 can suggest removing Jim as a recipient. In some embodiments, the system 1400 can suggest changes 1480 to the message 1420 in response to finding that the effect 1460 associated with one or more of the recipients 1430 is a negative effect. In some embodiments, the changes 1480 can modify the tone, feeling, or attitude of the content 1450 to eliminate the negative effect on one or more of the recipients 1430. In some embodiments, the system 1400 can allow a user to select the changes 1480 that the user desires and then can automatically edit the content 1450 of the message 1420 in accordance with the selected changes. For example, in the above message to Alfred Hitchcock and Jim Cameron saying, "Hello Alfred, You are so much better at XYZ than Jim," the system 1400 can suggest changing the language to "Hello Alfred, Your work with XYZ can be a great inspiration for Jim." Then, if the user selects that changed language, the system 1400 can automatically edit the email text to reflect these changes.

Figure 15:
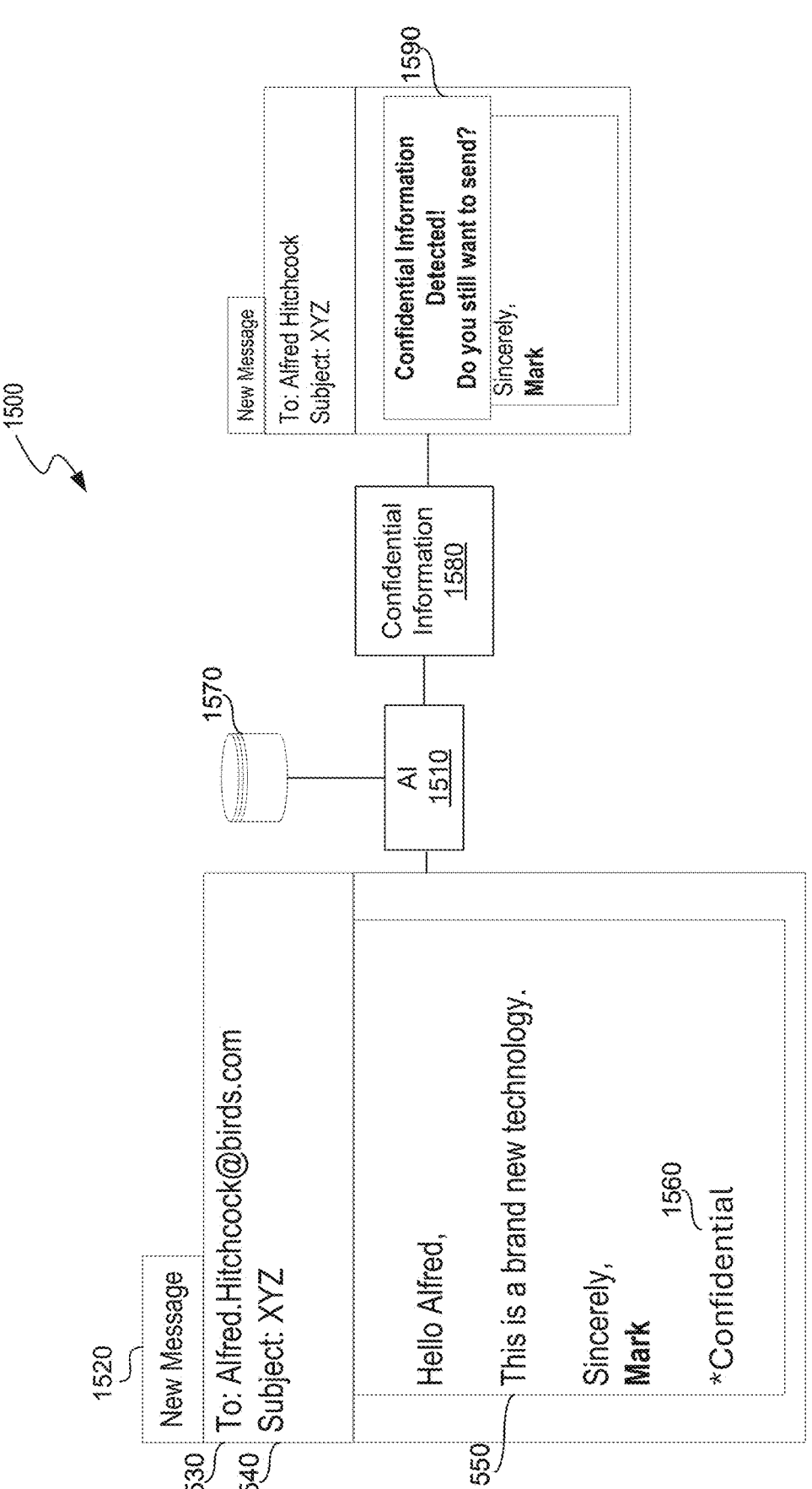
FIG. 15 shows a system where an AI warns a user when the user attempts to send confidential information to a recipient.

FIG. 15 shows a system where an AI warns a user when the user attempts to send confidential information to a recipient. The system 1500 includes an AI 1510 that can obtain a message 1520 with a recipient 1530, a subject matter 1540, content 1550, and a confidentiality label 1560. The subject matter 1540 can be a topic or topics relevant to the message 1520. For example, an email message about Client X can have a subject matter of "Client X." In some embodiments, the subject matter 1540 can be identified only by the matter in the subject line of a message (e.g., the subject line of an email). In other embodiments, the subject matter 1540 can be the matter discussed in the content 1550 of the message. The content 1550 of the message can include a text (e.g., the text of an email), an audio file of a communication (e.g., a voicemail), emojis, images, gifs, and other communications attachable to an email (e.g., a pdf file). The confidentiality label 1560 can include a text, an audio file, a watermark, or other confidentiality notation attachable to the content of the message 1520.

The AI 1510 can analyze the content 1550 of the message 1520 for a confidentiality label 1560 indicating that the content 1550 includes confidential information. In some embodiments, the system 1500 can check whether the recipient 1530 is authorized to access the confidential information through a database 1570. In some embodiments, the database 1570 can be a server associated with an organization of a user. In some embodiments, the database 1570 can contain information about which recipients have access to confidential information. In some embodiments, the database 1570 can segment confidential information, and recipients with access, by confidentiality label 1560 type. In some embodiments, the system 1500 can detect that a recipient 1530 of the message 1520 is not authorized to access confidential information 1580 based on comparing the recipient 1530 and the confidentiality label 1560 to the data contained in the database 1570. In some embodiments, upon detecting that a recipient 1530 does not have authorization to access the confidential information 1580 associated with the confidentiality label 1560, the system 1500 can send a warning 1590 that confidential information is being sent to an unauthorized recipient.

Figure 16:
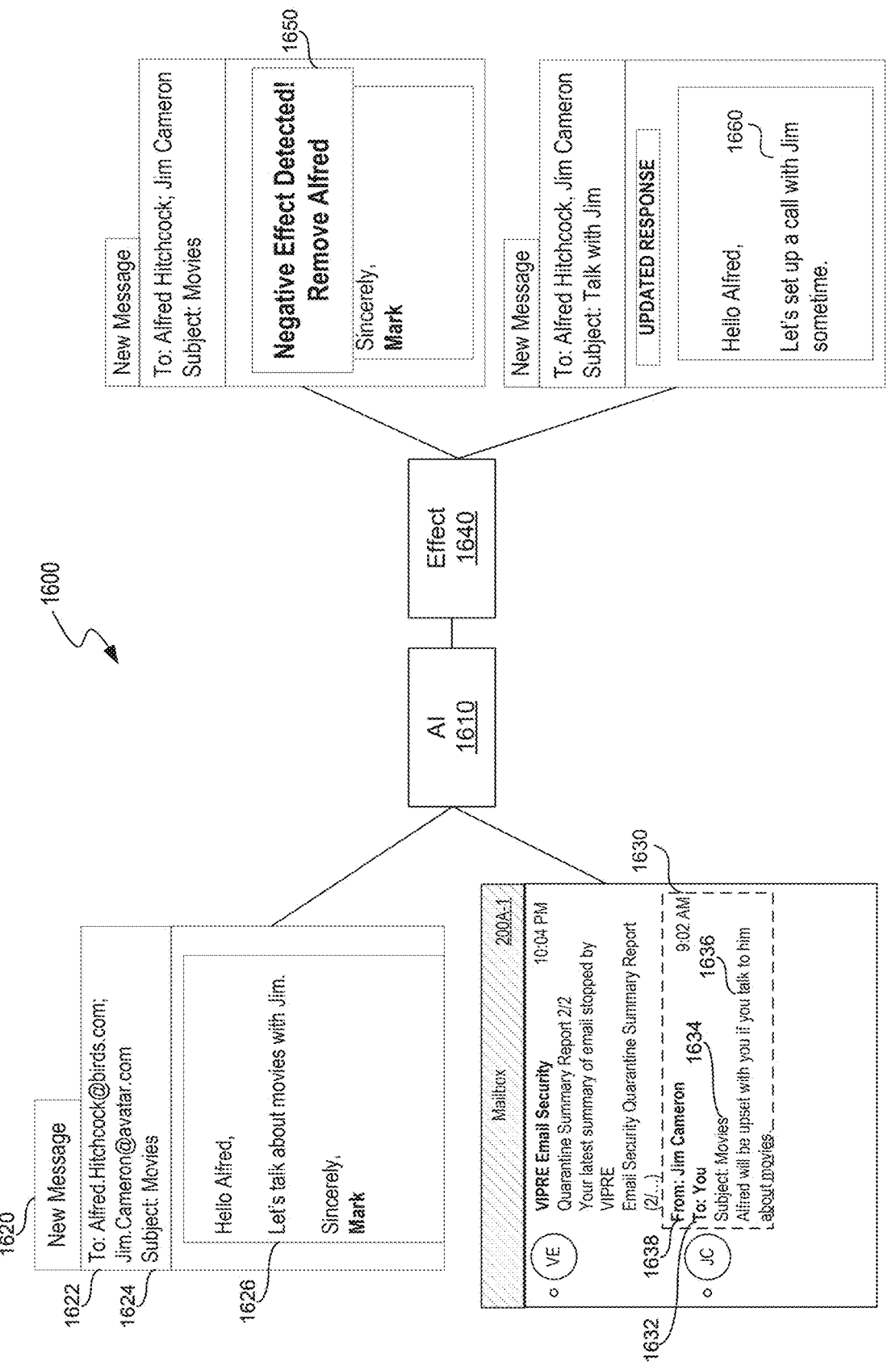
FIG. 16 shows a system where an AI suggests removing a recipient of a communication based on the combined effect on the recipient of the communication and one or more related communications.

FIG. 16 shows a system where an AI suggests removing a recipient of a communication based on the combined effect on the recipient of the communication and one or more related communications. The system 1600 includes an AI 1610 that can obtain a message 1620 with a recipient 1622, a subject matter 1624, and content 1626. The AI 1610 can also obtain a second message 1630 with a recipient 1632, a subject matter 1634, and additional content 1636. The subject matter 1624 of the message 1620 can be a topic or topics relevant to the message 1620. In some embodiments, the subject matter 1624 and the subject matter 1634 can only be the matter in the subject line of a message (e.g., the subject line of an email). In other embodiments, the subject matter 1624 can be matter discussed in the content 1626 of the message, and the subject matter 1634 can be matter discussed in additional content 1636. In some embodiments, the second message 1630 can be a message with subject matter 1634 that is related to the subject matter 1624 of the message 1620. In other embodiments, the second message 1630 can be a message with recipient 1632 that is the same as the recipient 1622 of message 1620. In other embodiments, the second message 1630 can be a message with sender 1638, who is the recipient 1622 of message 1620. The content 1626 of the message 1620 can include a text (e.g., the text of an email), an audio file of a communication (e.g., a voicemail), emojis, images, gifs, other communications attachable to an email (e.g., a pdf file), etc. The additional content 1636 of the second message 1630 can include a text (e.g., the text of an email), an audio file of a communication (e.g., a voicemail), emojis, images, gifs, other communications attachable to an email (e.g., a pdf file), etc.

The AI 1610 can analyze the content 1626 of a message 1620 for a tone, feeling, and attitude, as defined in FIG. 14, associated with the message 1620. The AI 1610 can also analyze the additional content 1636 of a second message 1630 for a tone, feeling, and attitude, as defined in FIG. 14, associated with the second message 1630. The AI 1610 can determine an effect 1640 of the message 1620 on the recipient 1622 based on both the tone, feeling, and attitude of the content 1626 of the message 1620 and the tone, feeling, and attitude of the additional content 1636 of the second message 1630. In some embodiments, the effect 1640 can be a positive effect, neutral effect, and negative effect, as described in FIG. 14. In some embodiments, the system 1600 determines whether effect 1640 of the message 1620 is positive, neutral, or negative. Then, the system 1600 updates the effect 1640 of the message 1620 on the recipient 1622 based on the tone, feeling, and attitude of the additional content 1636 of the second message 1630. For example, a first email message from Chris to Anna about a project saying "thanks for all of your hard work" may register as a positive effect; however, if a past email message from Chris to Anna about the same project says "you really let me down on this project," the system 1600 may recognize the thank you in the first email message was sarcastic and would have a negative effect on Anna.

In some embodiments, the AI 1610 determines the effect 1640 of a message 1620 by assigning weights and values to the tone, feeling, and attitude of the content 1626 of message 1620 and additional content 1636 of a second message 1630. The AI can assign values for the tone, feeling, and attitude of content 1626 and additional content 1636. Then, the AI can use Equation 1 above to calculate an individual effect of message 1620 and second message 1630. Then, the AI can use Equation 2 below to calculate the effect 1640 of message 1620 and second message 1630 combined.

$$\text{Combined Effect} = \frac{\begin{array}{c}\text{Effect of Message 1620} +\\ \text{Effect of Second Message 1630}\end{array}}{2} \qquad \text{Equation 2}$$

In some embodiments, the AI can determine a positive effect when Equation 2 results in a value between 0.33 and 1, a neutral effect when the equation results in a value between −0.33 and 0.33, and a negative effect when the equation results in a value between −1 and −0.33.

In some embodiments, the AI 1610 can obtain multiple messages with a recipient, a subject matter, and additional content related to message 1620. The AI 1610 can also analyze the additional content of the multiple messages for a tone, feeling, and attitude, as defined in FIG. 14. The AI 1610 can assign weights and values to the tone, feeling, and attitude of the additional content for each of the multiple messages. The AI can use Equation 1 above to calculate an individual effect of message 1620 and the multiple messages. In some embodiments, the AI can use Equation 3 below to calculate the effect 1640 of message 1620 and the multiple messages combined.

$$Effect = \frac{\begin{array}{c}\text{Effect of Message 1620} + \\ \text{Effect of Message 1 of the Multiple Messages} + \\ \text{Effect of Message 2 of the Multiple Messages} + \\ \text{... + Effect of Message N of the Multiple Messages}\end{array}}{N + 1} \qquad \text{Equation 3}$$

In some embodiments, the Equation 3 can apply more weight to more recent messages than other messages. For example, each message of the multiple messages can be multiplied by a decimal value between 0 and 1, where older messages are multiplied by smaller decimal values and more recent messages are multiplied by larger decimal values. In some embodiments, the AI 1610 can eliminate a message of the multiple messages from Equation 3 if the message is older than a specific threshold. For example, if the AI has a two-year threshold for Equation 3, a message of the multiple messages sent four years ago will not be included in the effect 1640 calculation.

In some embodiments, the system 1600 can send a notification 1650 that suggests removing the recipient 1622 of the message 1620 in response to finding that the effect 1640 associated with the recipient 1622 is a negative effect. For example, if a present email has two recipients, Alfred Hitchcock and Jim Cameron, and says, "Hello Alfred, Let's talk about movies with Jim," the system 1600 can suggest removing Alfred after analyzing a past email from Jim Cameron saying, "Alfred will be upset with you if you talk to him about movies." In some embodiments, the system 1600 can suggest changes 1660 to the message 1620 in response to finding that the effect 1640 associated with the recipient 1622 is a negative effect. In some embodiments, the changes 1660 can modify the tone, feeling, or attitude of the content 1626 to eliminate the negative effect on the recipient 1622. In some embodiments, the system 1600 can allow a user to select the changes 1660 that the user desires and then can automatically edit the content 1626 of the message 1620 in accordance with the selected changes. For example, in the above email to Alfred Hitchcock and Jim Cameron saying, "Hello Alfred, Let's talk about movies with Jim," the system 1600 can suggest changing the language to "Hello Alfred, Let's set up a call with Jim sometime" to avoid the potential negative effect on Alfred. Then, if the user selects that changed language, the system 1600 can automatically edit the email text to reflect these changes.

Figure 17:
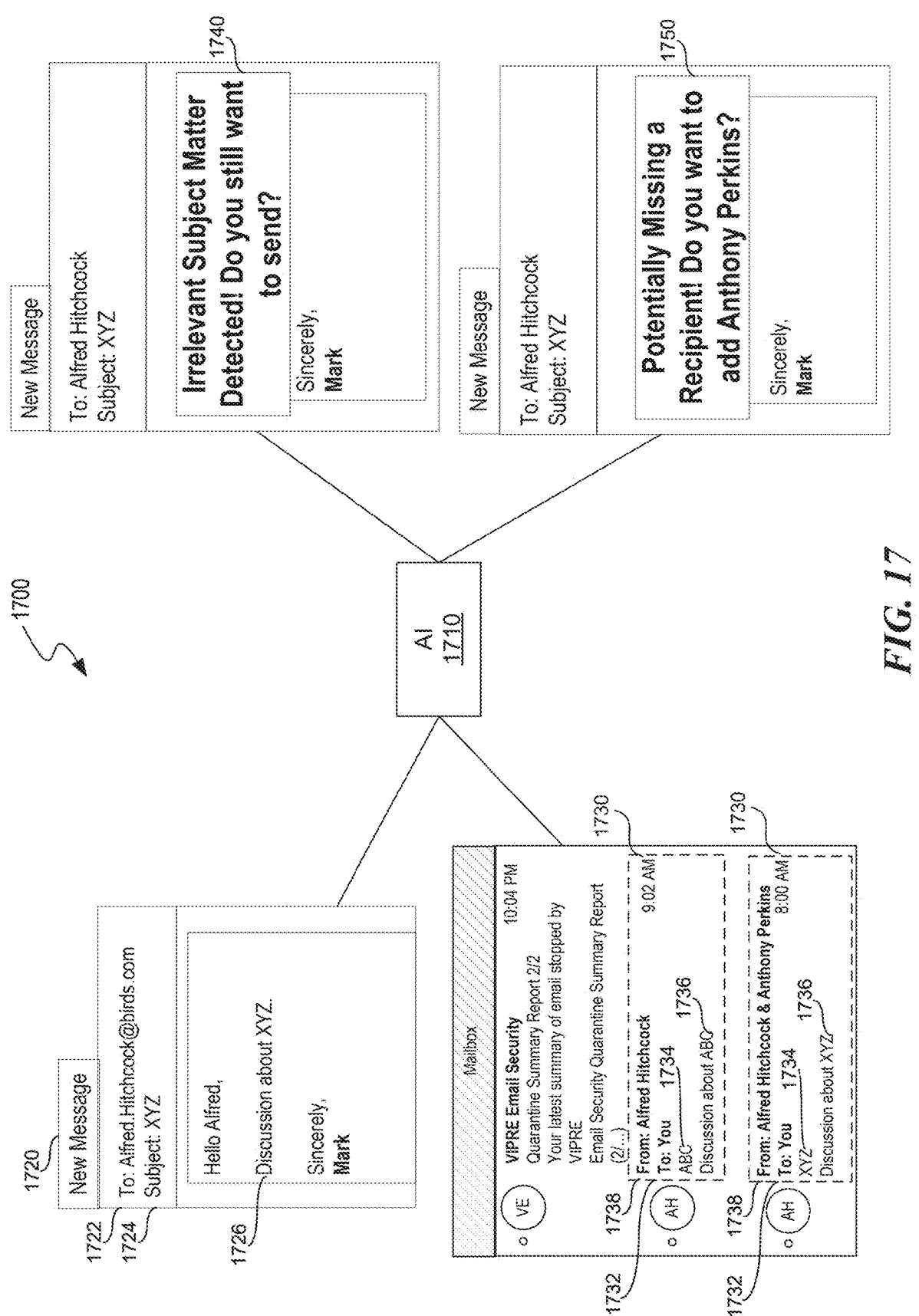
FIG. 17 shows a system where an AI warns a user that a communication may include irrelevant subject matter to a recipient and/or suggests adding a recipient to a communication.

FIG. 17 shows a system where an AI warns a user that a communication may include irrelevant subject matter to a recipient and/or suggests adding a recipient to a communication. The system 1700 includes an AI 1710 that can obtain a message 1720 with a recipient 1722, a subject matter 1724, and content 1726. The AI 1710 can also obtain a second message 1730 with a recipient 1732, a subject matter 1734, and additional content 1736. The subject matter 1724 of the message 1720 can be a topic or topics relevant to the message 1720. In some embodiments, the subject matter 1724 can only be the matter in the subject line of a message (e.g., the subject line of an email). In other embodiments, the subject matter 1724 can be matter discussed in the content 1726 of the message.

In some embodiments, the second message 1730 can be a message with a recipient 1732 or a sender 1738 that is the same as the recipient 1722 of the message 1720. The AI 1710 can analyze the subject matter 1734 of the second message 1730 to determine whether the subject matter 1734 of the second message 1730 relates to the subject matter 1724 of the message 1720. In response to the AI determining that the subject matter 1734 of the second message 1730 does not relate to the subject matter 1724 of the message 1720, the system 1700 can send a notification 1740 to the user to warn them that the message 1720 may not be relevant to recipient 1722. For example, when a user drafts an email to Alfred Hitchcock about XYZ, the system 1700 can analyze the subject matter of all emails sent by the user to Alfred Hitchcock or from Alfred Hitchcock to the user. If none of those emails relate to XYZ, the system 1700 can warn the user that they may be sending irrelevant subject matter about XYZ to Alfred Hitchcock because the user and Alfred Hitchcock have no email history discussing XYZ.

In some embodiments, the second message 1730 can be a message with the subject matter 1734 that is the same as the subject matter 1724 in message 1720. The system 1700 can determine whether the recipient 1732 of the second message 1730 is the recipient 1722 of the message 1720. In response to the AI determining that the recipient 1732 of the second message 1730 is not the recipient 1722 of the message 1720, the system can send to the user a notification 1750 that suggests adding the recipient 1732 to the message 1720. For example, when a user drafts an email to Alfred Hitchcock about XYZ, the system can analyze the recipients and senders of all emails sent and received by the user about XYZ. If the system recognizes that Anthony Perkins is frequently included on emails about XYZ, the system can suggest adding Anthony Perkins to the email.

Figure 18:
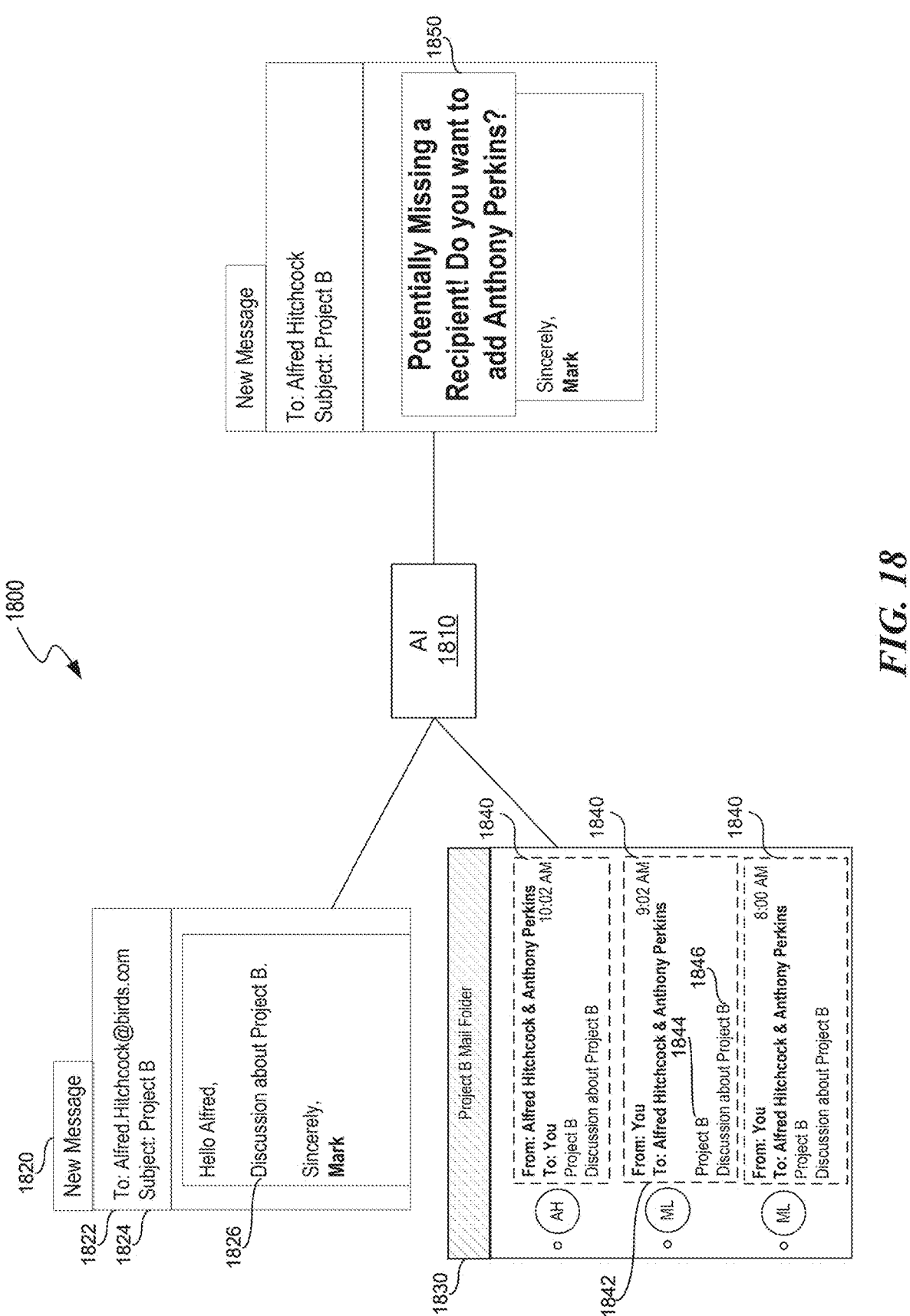
FIG. 18 shows a system where an AI suggests adding a recipient to a communication based on one or more folders related to the communication.

FIG. 18 shows a system where an AI suggests adding a recipient to a communication based on one or more folders related to the communication. The system 1800 includes an AI 1810 that can obtain a message 1820 with a recipient 1822, a subject matter 1824, and content 1826. The AI 1810 can also analyze a folder 1830 with one or more messages 1840 related to the subject matter 1826 of message 1820. In some embodiments, the AI 1810 can analyze multiple folders with one or more messages 1840 related to the subject matter 1826 of message 1820. Each of the one or more messages 1840 can include a recipient 1842, a subject matter 1844, and additional content 1846.

The subject matter 1824 of the message 1820 can be a topic or topics relevant to the message 1820. In some embodiments, the subject matter 1824 can only be the matter in the subject line of a message (e.g., the subject line of an email). In other embodiments, the subject matter 1824 can be matter discussed in the content 1826 of the message. The content 1826 of the message 1820 can include a text (e.g., the text of an email), an audio file of a communication (e.g., a voicemail), emojis, images, gifs, other communications attachable to an email (e.g., a pdf file), etc. In some embodiments, recipient 1842 of each of the one or more messages 1840 is who sent each of the one or more messages 1840 and who received each of the one or more messages 1840. The additional content 1846 of each of the one or more messages 1840 of folder 1830 can include a text (e.g., the text of an email), an audio file of a communication (e.g., a voicemail), emojis, images, gifs, other communications attachable to an email (e.g., a pdf file), etc.

In some embodiments, the AI 1810 can analyze each recipient 1842 of each of the one or more messages 1840 of folder 1830 to determine if a recipient 1842 is the recipient 1822 of the message 1820. If the AI 1810 determines that a recipient 1842 of one the one or more messages 1840 is not included in the message 1820, the AI 1810 can send a notification 1850 that suggests adding recipient 1842 to the message 1820. In one example, Mark may be sending an email about Project B to Alfred Hitchcock. Before sending the email, the disclosed technology can search a folder in Mark's email software related to Project B to see who Mark typically sends emails about Project B to. If Mark has sent emails about Project B to Alfred Hitchcock and Anthony Perkins, the disclosed technology can suggest that Mark add Anthony Perkins to the email Mark intends to send to Alfred Hitchcock.

Figure 19:
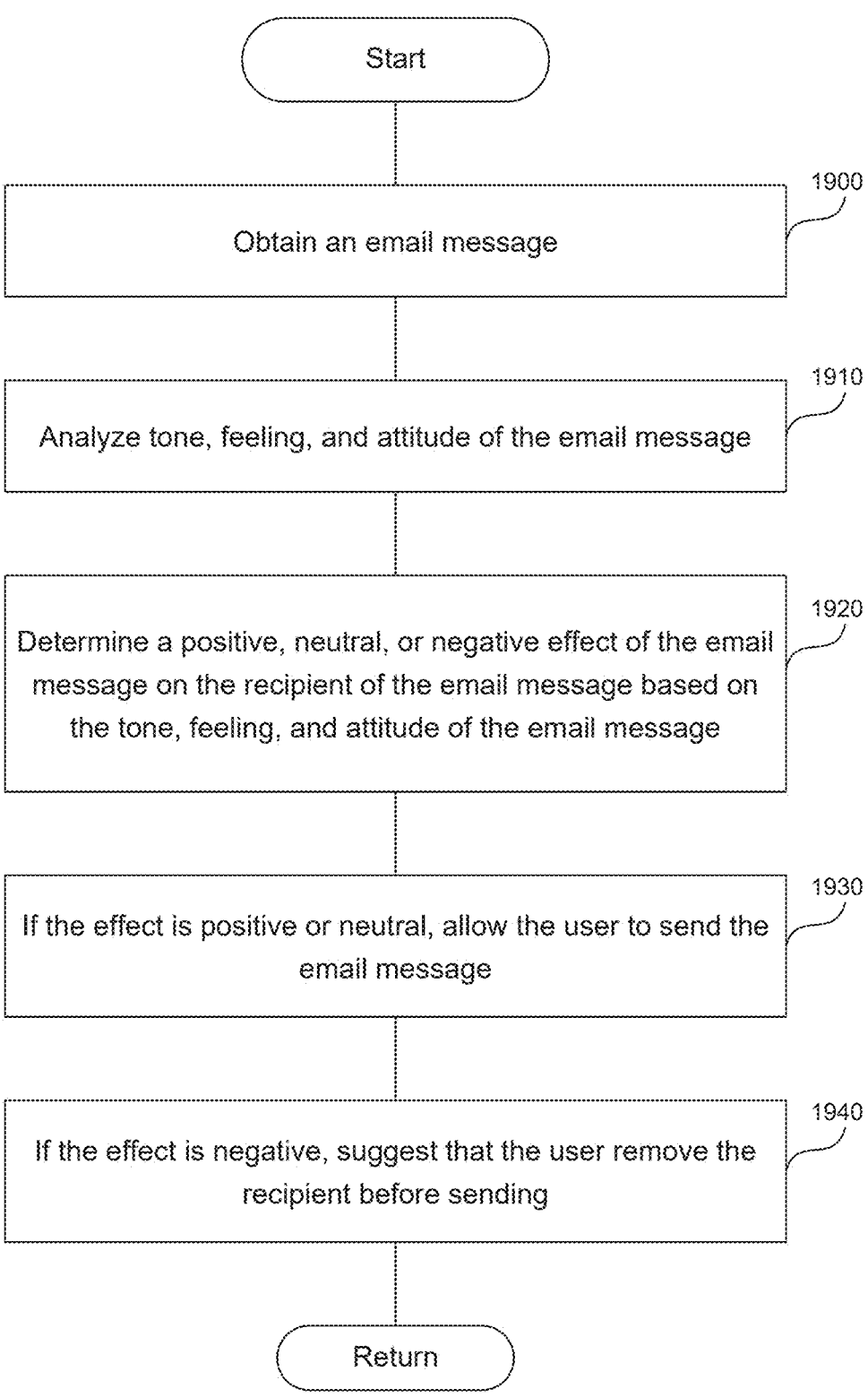
FIG. 19 is a flowchart of a method to enable an artificial intelligence (AI) to suggest removing a recipient of an email message based on the effect of said email message on the recipient.

FIG. 19 is a flowchart of a method to enable an artificial intelligence (AI) to suggest removing a recipient of an email message based on the effect of said email message on the recipient. A hardware or software processor executing instructions described in this application can, in step 1900, obtain an email message associated with the user. In some embodiments, the email message can be a message the user is drafting to one or more recipients and is about to send.

At step 1910, the processor can analyze, using an AI, an email message for the tone, feeling, and attitude of the email message. At step 1920, the processor, using an AI, can determine that the email message has a positive, neutral, or negative effect on the recipient based on the analyzed tone, feeling, and attitude. In some embodiments, the AI used by the processor determines the effect of the email message by assigning weighted values to the tone, feeling, and attitude of content. The AI can give the most weight to the analyzed feeling, the second most to tone, and the least to attitude. The AI can use an equation (e.g., Equation 1 above) to calculate an effect value and determine whether the resulting effect of the email message is positive, neutral, or negative based on predetermined effect value thresholds.

At step 1930, the processor can allow the user to send the email message if the determined effect of the email message on the one or more recipients is positive or neutral. At step 1940, the processor can suggest, before the user sends the email message, that the user remove one or more recipients of the email message if the determined effect of the email message on said one or more recipients is negative. In some embodiments, the processor can suggest removing a recipient by sending a notification to the user about the determined negative effect. The notification can overlay the email message.

Transformer for Neural Network

Figure 20:
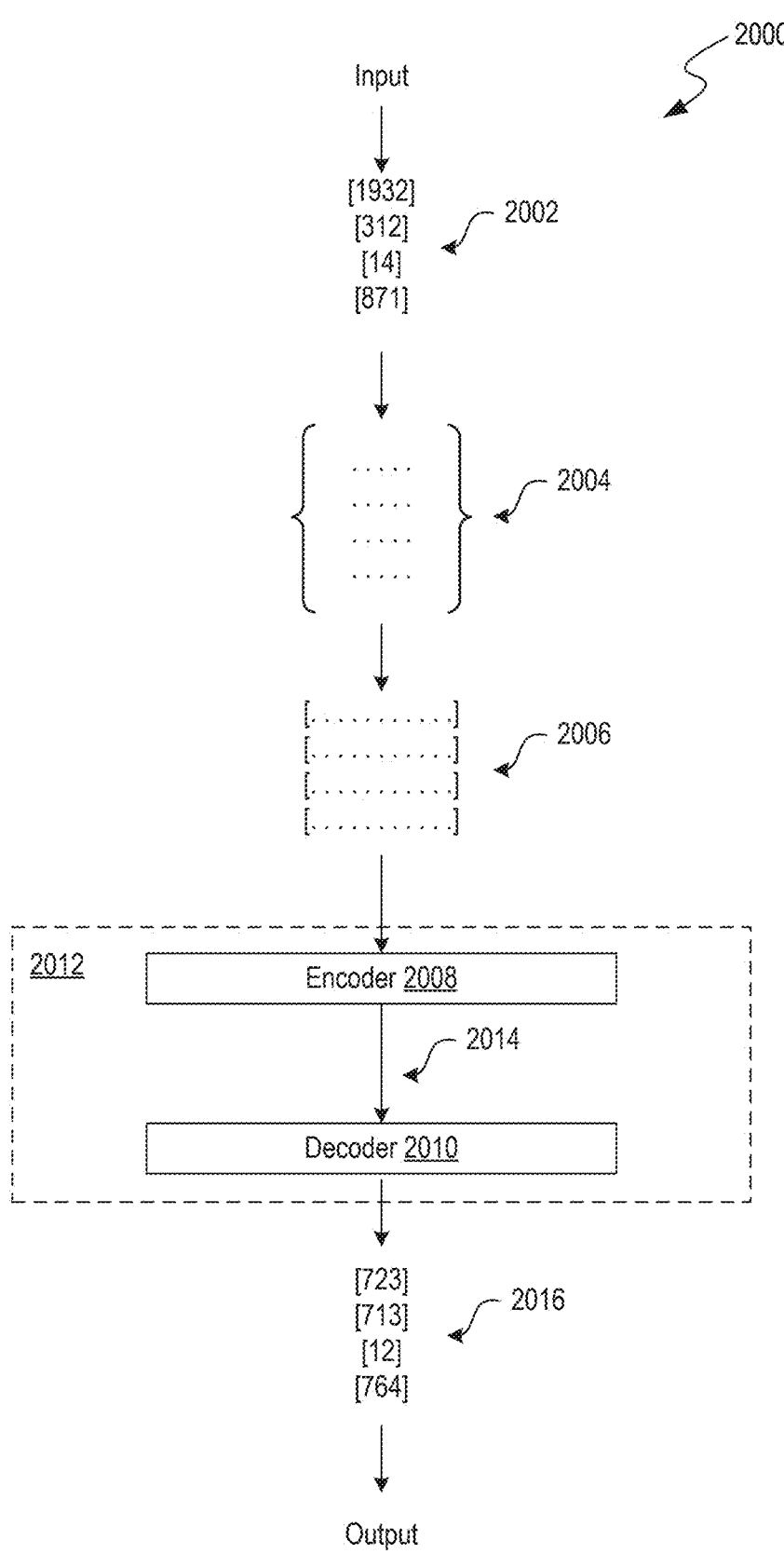
FIG. 20 is a block diagram of an example transformer.

To assist in understanding the present disclosure, some concepts relevant to AI 2000 in FIG. 20, including neural networks and machine learning (ML), are discussed herein. As described in this application, AI 2000 can be used to analyze content of multiple messages to determine grouping of the multiple messages and/or to suggest a visual indicator for the grouping of the multiple messages.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks, and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), generative adversarial networks (GANs), variational autoencoders (VAEs), and autoregressive models, among others.

DNNs are often used as ML-based models for modeling complex behaviors (e.g., human language, image recognition, object classification, etc.) in order to improve the accuracy of outputs (e.g., more accurate predictions), for example, as compared with models with fewer layers. In the present disclosure, the term "ML-based model" or, more simply, "ML model" may be understood to refer to a DNN. Machine learning refers to a subset of artificial intelligence that involves the development of algorithms and statistical models that enable computers to perform tasks without explicit instructions, by learning from and making predictions or decisions based on data. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online web pages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder) or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimizing a loss or maximizing a reward) in order to bring the output value as close to the target value as possible. The goal of training the ML model typically is to minimize a loss function or maximize a reward function.

The training data can be a subset of a larger dataset. For example, a dataset may be split into three mutually exclusive subsets: a training set, a validation (or cross-validation) set, and a testing set. The three subsets of data may be used sequentially during ML model training. For example, the training set may be first used to train one or more ML models, each ML model having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performance-trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger dataset and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed, and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture) unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistants).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

FIG. 20 is a block diagram of an example transformer 2012. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 2012 includes an encoder 2008 (which can include one or more encoder layers/blocks connected in series) and a decoder 2010 (which can include one or more decoder layers/blocks connected in series). Generally, the encoder 2008 and the decoder 2010 each include multiple neural network layers, at least one of which can be a self-attention layer. The parameters of the neural network layers can be referred to as the parameters of the language model.

The transformer 2012 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 2012 is trained to perform certain functions on input formats other than natural language input. For example, the input can include objects, images, audio content, video content, or a combination thereof.

The transformer 2012 can be trained on a text corpus that is labeled (e.g., annotated to indicate verbs, nouns, etc.) or unlabeled. LLMs can be trained on a large unlabeled corpus. The term "language model," as used herein, can include an ML-based language model (e.g., a language model that is implemented using a neural network or other ML architecture) unless stated otherwise. Some LLMs can be trained on a large multi-language, multi-domain corpus to enable the model to be versatile at a variety of language-based tasks, such as generative tasks (e.g., generating human-like natural language responses to natural language input).

FIG. 20 illustrates an example of how the transformer 2012 can process textual input data. Input to a language model (whether transformer-based or otherwise) typically is in the form of natural language that can be parsed into tokens. The term "token" in the context of language models and NLP has a different meaning from the use of the same term in other contexts, such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph, etc.), an [EOT] token can be another special token that indicates the end of the textual sequence, and other tokens can provide formatting information, etc.

In FIG. 20, a short sequence of tokens 2002 corresponding to the input text is illustrated as input to the transformer 2012. Tokenization of the text sequence into the tokens 2002 can be performed by some pre-processing tokenization module such as, for example, a byte-pair encoding tokenizer (the "pre" referring to the tokenization occurring prior to the processing of the tokenized input by the LLM), which is not shown in FIG. 20 for brevity. In general, the token sequence that is inputted to the transformer 2012 can be of any length up to a maximum length defined based on the dimensions of the transformer 2012. Each token 2002 in the token sequence is converted into an embedding vector 2006 (also referred to as "embedding 2006").

An embedding 2006 is a learned numerical representation (such as, for example, an embedding vector, e.g., vector) of a token that captures some semantic meaning of the text segment represented by the token 2002. The embedding 2006 represents the text segment corresponding to the token 2002 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 2006 corresponding to the "write" token will be closer to another embedding corresponding to the "jot down" token in the vector space as compared to the distance between the embedding 2006 corresponding to the "write" token and another embedding corresponding to the "summary" token.

The vector space can be defined by the dimensions and values of the embedding vectors. Various techniques can be used to convert a token 2002 to an embedding 2006. For example, another trained ML model can be used to convert the token 2002 into an embedding 2006. In particular, another trained ML model can be used to convert the token 2002 into an embedding 2006 in a way that encodes additional information into the embedding 2006 (e.g., a trained ML model can encode positional information about the position of the token 2002 in the text sequence into the embedding 2006). In some implementations, the numerical value of the token 2002 can be used to look up the corresponding embedding in an embedding matrix 2004, which can be learned during training of the transformer 2012.

The generated embeddings 2006 are input into the encoder 2008. The encoder 2008 serves to encode the embeddings 2006 into feature vectors 2014 that represent the latent features of the embeddings 2006. The encoder 2008 can encode positional information (i.e., information about the sequence of the input) in the feature vectors 2014. The feature vectors 2014 can have very high dimensionality (e.g., on the order of thousands or tens of thousands), with each element in a feature vector 2014 corresponding to a respective feature. The numerical weight of each element in a feature vector 2014 represents the importance of the corresponding feature. The space of all possible feature vectors 2014 that can be generated by the encoder 2008 can be referred to as a latent space or feature space.

Conceptually, the decoder 2010 is designed to map the features represented by the feature vectors 2014 into meaningful output, which can depend on the task that was assigned to the transformer 2012. For example, if the transformer 2012 is used for a translation task, the decoder 2010 can map the feature vectors 2014 into text output in a target language different from the language of the original tokens 2002. Generally, in a generative language model, the decoder 2010 serves to decode the feature vectors 2014 into a sequence of tokens. The decoder 2010 can generate output tokens 2016 one by one. Each output token 2016 can be fed back as input to the decoder 2010 in order to generate the next output token 2016. By feeding back the generated output and applying self-attention, the decoder 2010 can generate a sequence of output tokens 2016 that has sequential meaning (e.g., the resulting output text sequence is understandable as a sentence and obeys grammatical rules). The decoder 2010 can generate output tokens 2016 until a special [EOT] token (indicating the end of the text) is generated. The resulting sequence of output tokens 2016 can then be converted to a text sequence in post-processing. For example, each output token 2016 can be an integer number that corresponds to a vocabulary index. By looking up the text segment using the vocabulary index, the text segment corresponding to each output token 2016 can be retrieved, the text segments can be concatenated together, and the final output text sequence can be obtained.

In some implementations, the input provided to the transformer 2012 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user, and the output can include a high-level summary of the meeting notes. In other examples, the input provided to the transformer includes a question or a request to generate text. The output can include a response to the question, text associated with the request, or a list of ideas associated with the request. For example, the input can include the question, "What is the weather like in San Francisco?" and the output can include a description of the weather in San Francisco. As another example, the input can include a request to brainstorm names for a flower shop, and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). Bidirectional Encoder Representations from Transformers (BERT) is an example of a language model that can be considered to be an encoder-only language model. A decoder-only language model accepts embeddings as input and can use autoregression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Computer System

Figure 21:
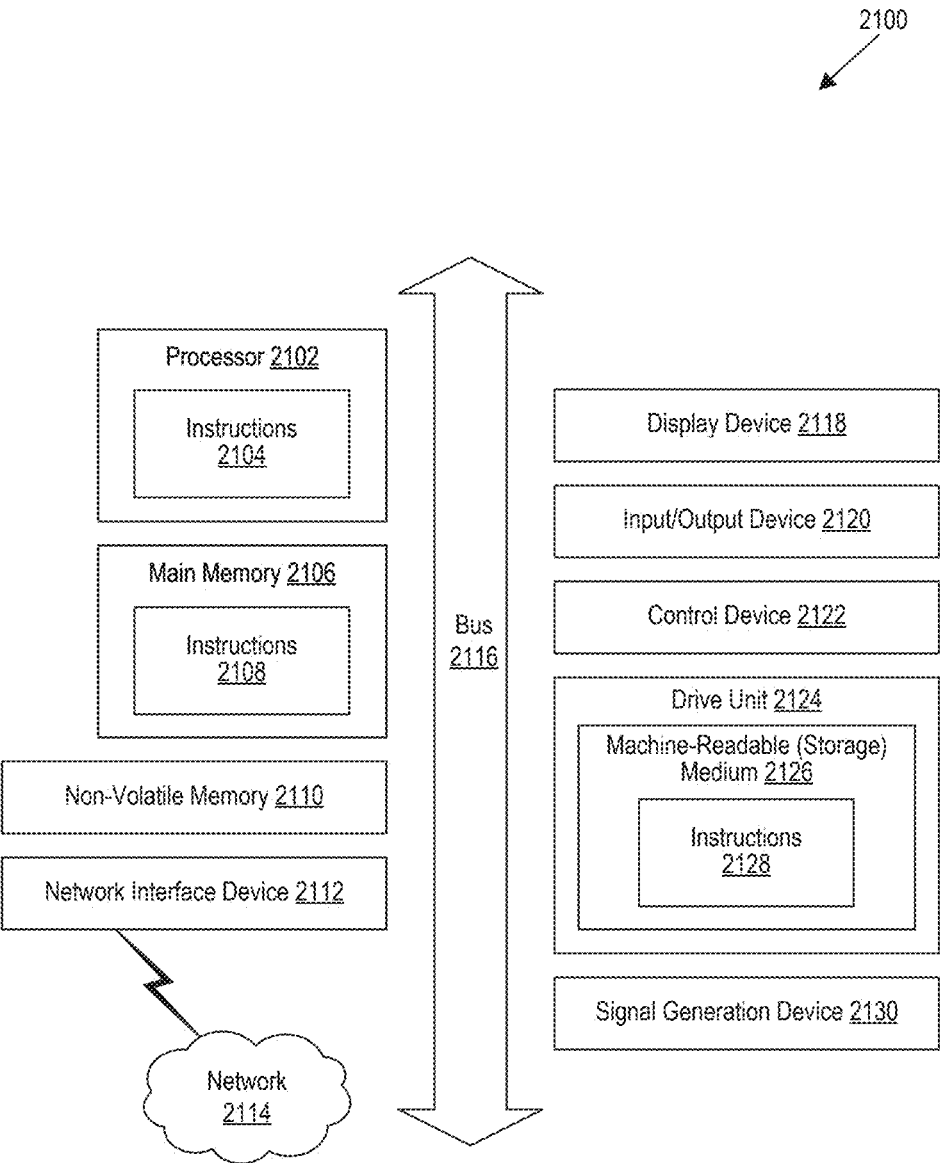
FIG. 21 is a block diagram that illustrates an example of a computer system in which at least some operations described herein can be implemented.

FIG. 21 is a block diagram that illustrates an example of a computer system 2100 in which at least some operations described herein can be implemented. As shown, the computer system 2100 can include one or more processors 2102, main memory 2106, non-volatile memory 2110, a network interface device 2112, a video display device 2118, an input/output device 2120, a control device 2122 (e.g., keyboard and pointing device), a drive unit 2124 that includes a machine-readable (storage) medium 2126, and a signal generation device 2130 that are communicatively connected to a bus 2116. The bus 2116 represents one or more physical buses and/or point-to-point connections that are connected by appropriate bridges, adapters, or controllers. Various common components (e.g., cache memory) are omitted from FIG. 21 for brevity. Instead, the computer system 2100 is intended to illustrate a hardware device on which components illustrated or described relative to the examples of the figures and any other components described in this specification can be implemented.

The computer system 2100 can take any suitable physical form. For example, the computing system 2100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 2100. In some implementations, the computer system 2100 can be an embedded computer system, a system-on-chip (SOC), a single-board computer system (SBC), or a distributed system such as a mesh of computer systems, or it can include one or more cloud components in one or more networks. Where appropriate, one or more computer systems 2100 can perform operations in real time, in near real time, or in batch mode.

The network interface device 2112 enables the computing system 2100 to mediate data in a network 2114 with an entity that is external to the computing system 2100 through any communication protocol supported by the computing system 2100 and the external entity. Examples of the network interface device 2112 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 2106, non-volatile memory 2110, machine-readable medium 2126) can be local, remote, or distributed. Although shown as a single medium, the machine-readable medium 2126 can include multiple media (e.g., a centralized/distributed database and/or associated caches and servers) that store one or more sets of instructions 2128. The machine-readable medium 2126 can include any medium that is capable of storing, encoding, or carrying a set of instructions for execution by the computing system 2100. The machine-readable medium 2126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 2110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2104, 2108, 2128) set at various times in various memory and storage devices in computing device(s). When read and executed by the processor 2102, the instruction(s) cause the computing system 2100 to perform operations to execute elements involving the various aspects of the disclosure.

Figure 22:
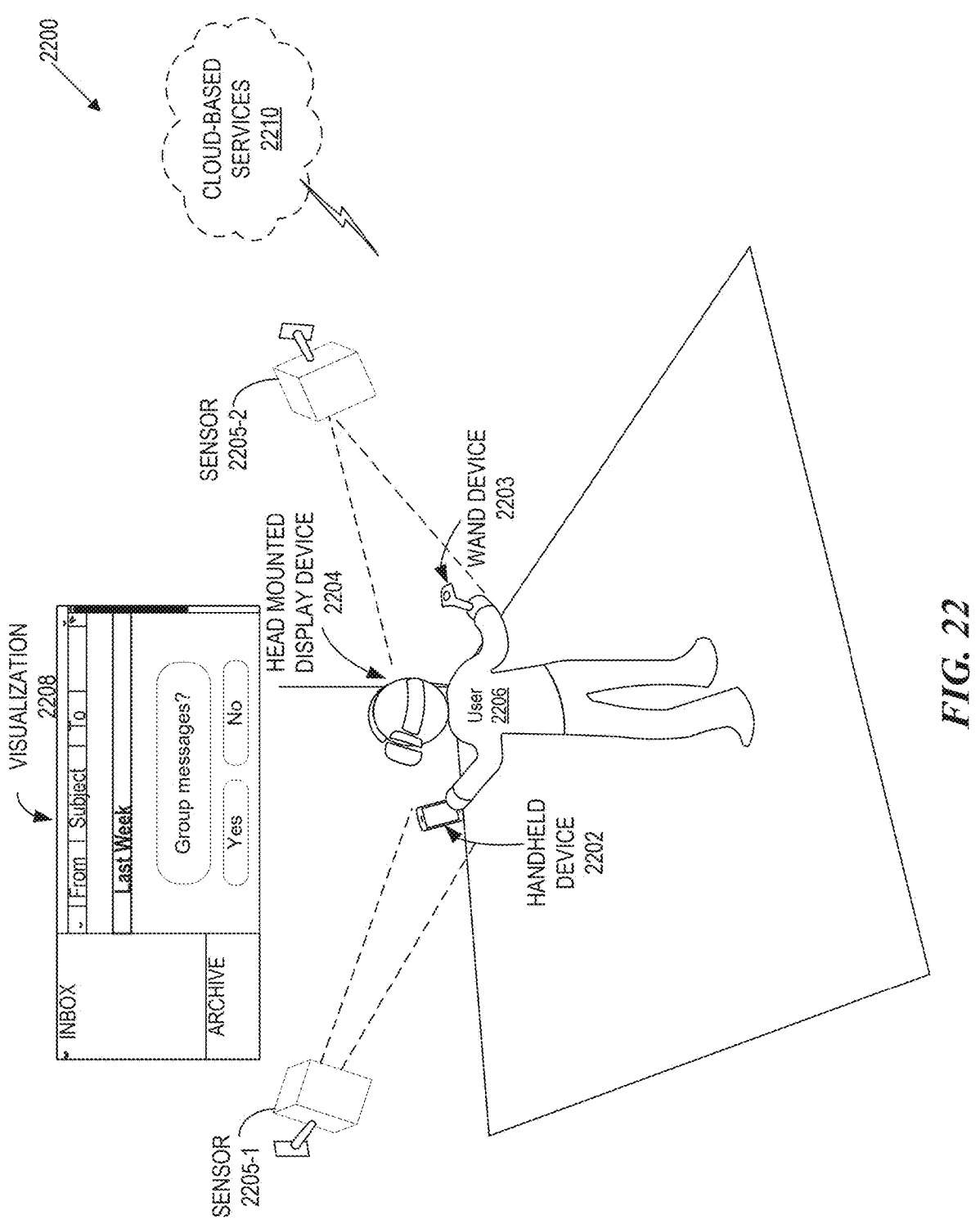
FIG. 22 illustrates a user engaged with a mixed reality system for immersive message management.

FIG. 22 illustrates a user engaged with a mixed reality system 2200 for immersive message management. The components of the system 2200 can include a handheld device 2202 that administers a session running on other components of the system 2200, including a head-mounted display (HMD) device 2204 that renders a partial or full 360-degree interface. The system 2200 can also include motion or position sensors 2205-1 and 2205-2, which are fixed in a room or worn by the user 2206, such as, for example, sensors of wearables. The HMD device 2204 can be an AR/VR/XR device. In some embodiments, the HMD device 2204 can include glasses.

A near-eye display device, commonly referred to as an HMD device, is an optical apparatus designed to present visual information directly in front of the user's eyes. This technology is composed of several integral components that work in unison to deliver a seamless and immersive visual experience.

Central to the near-eye display device lies the optical module. The optical module includes lenses and other optical elements that project images from a microdisplay or similar image source directly into the user's eyes. The optical module is engineered to ensure that the images are clear, focused, and appear at a comfortable viewing distance, thereby enhancing the overall user experience.

The microdisplay is a small yet high-resolution display panel responsible for generating the visual content. Utilizing technologies such as Liquid Crystal Display (LCD), Organic Light Emitting Diode (OLED), Liquid Crystal on Silicon (LCoS), or Digital Light Processing (DLP), the microdisplay renders the images or video content that the user perceives.

Supporting these components is the frame and housing, which provide the structural integrity needed to hold the optical module and microdisplay in place. Designed to be lightweight and comfortable for extended wear, the frame often includes adjustable straps or other mechanisms to ensure a secure and personalized fit on the user's head.

Modern near-eye display devices are equipped with an array of sensors, including accelerometers, gyroscopes, magnetometers, and eye-tracking sensors. These sensors enable head tracking, motion detection, and gaze tracking, significantly enhancing the interactivity and immersive nature of the device. The data collected by these sensors is processed by a built-in or connected processing unit, which handles the computation required for rendering images, processing sensor data, and managing user inputs. This processing unit may be integrated into the device or connected via a wired or wireless link to an external computer or mobile device.

Connectivity interfaces such as USB, HDMI, Bluetooth, or Wi-Fi are also integral to the device, allowing it to interface with external devices, transfer data, or receive content. The power supply, typically a battery or power management system, provides the necessary energy to operate the device efficiently, supporting extended usage without frequent recharging.

User interaction with the near-eye display device is facilitated through various user interface options, including physical buttons, touchpads, voice control, or gesture recognition systems. Additionally, some devices feature integrated speakers or headphone jacks to provide audio output, further enhancing the multimedia experience.

As illustrated, the handheld device 2202 operates as a wand to navigate objects of the visualization 2208 experienced by the user 2206 through the HMD device 2204. A dedicated wand device 2203 (e.g., with one or more dedicated hardware buttons) can additionally or alternatively be used for navigation. In another example, the sensors 2205-1 and 2205-2 can detect the position and/or movement of the user's finger in the air to perform the functions included in the examples illustrated in FIGS. 1 through 4, which could be rendered in a mixed reality session, e.g., on the handheld device 2202. For example, the queries regarding grouping of messages, or the queries regarding visualizations of group messages, can be presented to the user 2206 through the visualization 2208.

In some embodiments, some components of the system 2200 are remotely located from the user. For example, cloud components can provide cloud-based services 2210 to administer the mixed reality session running on the components of the system 2200 or provide services or content for a mixed reality session. Hence, administration of a mixed reality session could be through the HMD device 2204, augmented with the handheld device 2202, and/or with the cloud-based services 2210 that receive session progress feedback (e.g., anywhere outside of a room where the user is experiencing a simulation).

As shown, the HMD device 2204 can provide content (e.g., visualization 2208) of a mixed reality session and process feedback from the user via the handheld device 2202 to navigate the visualization 2208. As shown, the HMD device 2204 is a near-to-eye display system that is worn by the user 2206. For example, the HMD device 2204 can have a chassis and various electrical and optical components to enable an immersive experience for the user 2206 wearing the HMD device 2204. For example, the HMD device 2204 can include a display for each of the user's eyes. The displays can render a real-world scene of a simulation for view by the user's eyes when the HMD device 2204 is worn by the user. The HMD device 2204 can also include a camera mounted to the chassis. The camera can capture movement of the user's pupils for physiological feedback responsive to simulated scenes being rendered. The HMD device 2204 may also include a network interface enabling the handheld device 2202 to communicatively couple to the HMD device 2204 over a wireless connection.

In some embodiments, the HMD device 2204 includes features for measuring the user's physiological activity. For example, the HMD device 2204 can include components to measure the user's electrical brain activity. As such, the HMD device 2204 can collect physiological data in combination with any direct input by the user. In some embodiments, the physiological data can be used to supplement the user's conscious inputs. In some embodiments, the physiological data could be used to compare against the user's conscious input.

In one example, the HMD device 2204 can render a virtual immersive environment by displaying images in view of the user's eyes such that the user can only see the images (e.g., visualization 2208) and see nothing of the real world. The HMD device 2204 can also render an AR environment. As such, the user can see the visualization 2208 overlaying the real world while the HMD device 2204 is worn by the user 2206. Hence, to achieve an AR environment, the user in an augmented reality simulation has a transparent view with digital objects overlaid or superimposed on the user's real-world view.

Examples of the sensors 2205-1 and 2205-2 include cameras or motion detectors that are positioned proximate to the user such that the sensors 2205-1 and 2205-2 can obtain real-world feedback responsive to interactions with a simulated real-world scene. For example, cameras facing the user can detect the user 1906's movement while the user is engaged in a simulation and provide feedback to the HMD device 2204 administering the simulation. The handheld device 2202 can be used by the user 2206 to submit input, which can include actuating buttons for the user 2206 to input data and/or accelerometers that detect spatial movement. For example, the user 2206 can move the handheld device 2202 to provide inputs responsive to a scene administered by the HMD device 2204.

The visualization 2208 is one example of many that can be rendered in a mixed reality session. FIGS. 1-4 show examples of visualizations that could likewise be rendered in a mixed reality session. The user 2206 can select and move objects of the visualization 2208 in a manner described with respect to FIGS. 1-4. As described further below, the system 2200 can include servers that are remotely located from the user 2206 and can access a program administered by the HMD device 2204. Further, a local software generation and distribution framework can be used to rapidly scale content. The core components and services can support complex user and session elements that can be easily managed by a service provider. As such, a platform of a mixed reality system can standardize interaction elements such as a session landing, sign-in, navigation rules, and the like. A top-level abstraction layer can support customization, such as a sequence of sessions or scenes or conditional ordering of sessions or scenes. Services can include authentication, tracking, reports, user services, help services, pause and resume services, and the like.

Figure 23:
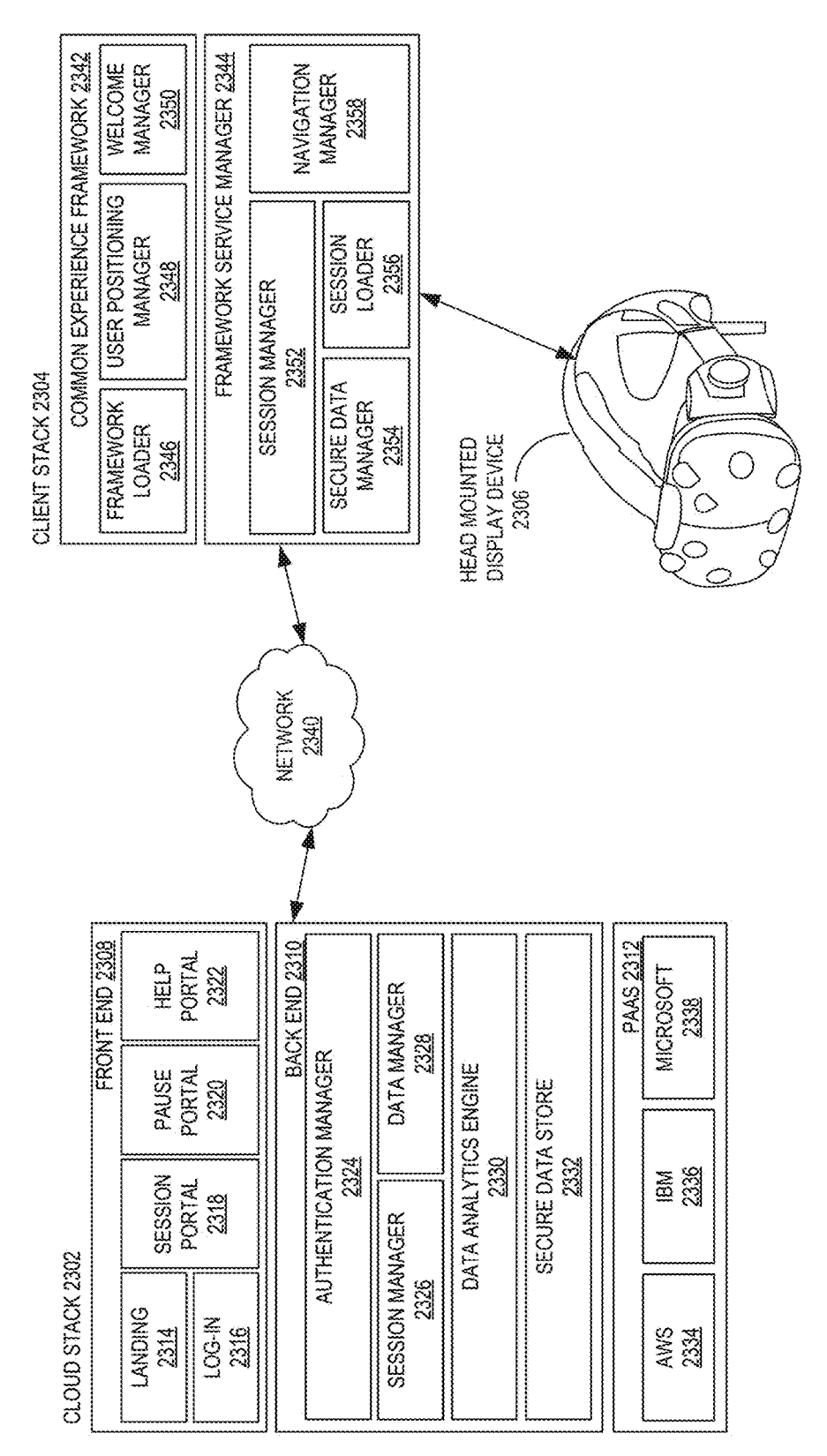
FIG. 23 is a block diagram illustrating a cloud stack and a client stack architecture for a platform that can collectively administer a mixed reality session on an HMD device.

FIG. 23 is a block diagram illustrating a cloud stack 2302 and a client stack 2304 architecture for a platform 2300 that can collectively administer a mixed reality session on an HMD device 2306. As shown, the cloud stack 2302 includes three primary layers: a front end layer 2308, a back end layer 2310, and a platform as a service (PaaS) layer 2312. The front end layer 2308 includes a landing component 2314 and a login component 2316. The two components 2314 and 2316 are executed at the beginning of a session administered to orient a user and seek login credentials to control access to message programs and user information of the platform 2300. The front end layer 2308 also includes a session portal 2318, pause portal 2320, and help portal 2322. The session portal 2318 is for normal front-facing operations of a simulation session, whereas the pause portal 2320 is for operations while the session is paused. Lastly, the help portal 2322 can help the user or administrator to address questions related to the platform 2300 or simulation.

The back end layer 2310 includes an authentication manager 2324 that can authenticate a user and/or an administrator of the platform 2300. A session manager 2326 can manage access to a particular session. A data manager 2328 can manage user data and/or data about the session such as any feedback from users while engaged in sessions. For example, the data manager 2328 can collect feedback data from multiple users including their inputs and physiological data. A data analytics engine 2330 can process the collected data to determine the actions of users and to learn how to improve the sessions (e.g., mixed reality scenes). A secure data store 2332 can store sensitive data such as data that identifies users. Lastly, the PaaS layer 2312 includes cloud computing services that provide the platform 2300 for clients to administer the mixed reality sessions. Examples include AMAZON WEB SERVICES (AWS) 2334 or services provided by IBM 2336 and/or MICROSOFT 2338.

The cloud stack 2302 is communicatively connected to the client stack 2304 over a network 2340, such as the Internet. The client stack 2304 includes a common experience framework layer 2342 and a framework service manager layer 2344. The common experience framework layer 2342 includes a framework loader 2346 to load the framework for a session, a user positioning manager 2348 to monitor and track the relative position of the user engaged with the session, and a welcome manager 2350 to orient the user at the beginning of the session.

The framework service manager layer 2344 includes a session manager 2352 to manage the session experienced by a user wearing the HMD device 2306. The framework service manager layer 2344 also includes a secure data manager 2354 to store or anonymize any sensitive data, a session load manager 2356 for loading a session, and a navigation manager 2358 for navigating a user through mixed reality scenes of a message management program. The platform 2300 is merely illustrative to aid the reader in understanding an embodiment. Other embodiments may include fewer or additional layers/components known to persons skilled in the art but omitted for brevity.

REMARKS

The terms "example," "embodiment," and "implementation" are used interchangeably. For example, references to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above and any that may be listed in accompanying filing papers are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions, when executed by at least one data processor of a system, cause the system to:

obtain an email message,
   wherein the email message includes a recipient,
   wherein the email message includes a subject matter,
   wherein the email message contains content comprising one or more of a text of an email, an audio file of a communication, emojis, images, gifs, and a communication attachable to an email;

analyze, via an artificial intelligence, a tone, a feeling, and an attitude of the content of the email message,
   wherein the tone associated with the email message includes an implicit feeling expressed by the email message,
   wherein the feeling associated with email message includes an explicit feeling expressed by the email message, wherein an attitude includes a pattern of behavior expressed over a first multiplicity of email messages associated with a user;

determine, via the artificial intelligence, an effect of the email message on the recipient, wherein the artificial intelligence determines the effect of the email message on the recipient based on the tone, the feeling, and the attitude of the content of the email message, wherein the effect includes a positive effect, a neutral effect, and a negative effect; and suggest, in response to the effect being a negative effect associated with the recipient, removing the recipient of the email message.

2. The non-transitory, computer-readable storage medium of claim 1, comprising instructions to:

suggest, in response to the artificial intelligence determining that the email message has a negative effect on the recipient, one or more changes to the content of the email message, wherein the one or more changes to the content modify the tone, the feeling, or the attitude of the content, wherein the artificial intelligence determines that the one or more changes eliminate the negative effect on the recipient; and edit, in response to the user selecting the one or more changes, the content of the email message to conform with a chosen change.

3. The non-transitory, computer-readable storage medium of claim 1, comprising instructions to:

analyze, via the artificial intelligence, the content of the email message for confidential information;

wherein the artificial intelligence identifies confidential information by recognizing a confidentiality label, wherein a confidentiality label includes a text, an audio file, a watermark, or a confidentiality notation attachable to the content of the email message;

check, in response to finding confidential information, whether the recipient is authorized to access the confidential information; and warn the user, in response to the recipient not having authorization to access the confidential information, of the confidential information in the email message.

4. The non-transitory, computer-readable storage medium of claim 1, wherein the instructions further cause the system to:

obtain a second email message, wherein the second email message has one or more of a subject matter related to the email message, the recipient of the email message, or a sender who is the recipient of the email message, wherein the second email message contains additional content comprising one or more of a text of an email, an audio file of a communication, emojis, images, gifs, and a communication attachable to an email;

analyze, via the artificial intelligence, a tone, a feeling, and an attitude of the additional content of the second email message;

update, by the artificial intelligence, the effect of the email message on the recipient based on the tone, the feeling, and the attitude of the additional content of the second email message; and suggest, in response to the effect being a negative effect associated with the recipient, removing the recipient of the email message.

5. The non-transitory, computer-readable storage medium of claim 4, wherein the second email message has the recipient of the email message or a sender who is the recipient of the email message, comprising instructions to:

analyze, via the artificial intelligence, the subject matter of the second email message;

determine, via the artificial intelligence, whether the subject matter of the email message relates to the subject matter of the second email message; and warn the user, in response to the artificial intelligence determining that the subject matter of the email message does not relate to the subject matter of the second email message, that subject matter of the email message does not relate to subject matter of the second email message.

6. The non-transitory, computer-readable storage medium of claim 4, wherein the second email message is of a subject matter related to the email message, comprising instructions to:

identify a second recipient of the second email message;

determine whether the second recipient of the second email message is the recipient of the email message; and suggest, in response to determining that the second recipient of the second email message is not the recipient of the email message, adding the second recipient to the email message.

7. The non-transitory, computer-readable storage medium of claim 1, wherein the instructions further cause the system to:

obtain a folder, wherein the folder comprises a second multiplicity of email messages associated with the subject matter of the email message, wherein each email message of the second multiplicity of email messages includes a third recipient;

determine whether the third recipient of the second multiplicity of email messages associated with the subject matter of the email message is the recipient of the email message; and suggest, in response to determining that the third recipient of the second multiplicity of email messages associated with the subject matter of the email message is not the recipient of the email message, adding the third recipient to the email message.

8. A system comprising:

at least one hardware processor; and at least one non-transitory memory storing instructions, which, when executed by the at least one hardware processor, cause the system to:

obtain a digital communication, wherein the digital communication includes a recipient, wherein the digital communication includes a subject matter, wherein the digital communication contains content comprising one or more of a text, an audio file, emojis, images, gifs, and a communication attachable to a digital communication;

analyze, via an artificial intelligence, a tone, a feeling, and an attitude of the content of the digital communication, wherein the tone associated with the digital communication includes an implicit feeling expressed by the digital communication, wherein the feeling associated with digital communication includes an explicit feeling expressed by the digital communication, wherein an attitude includes a pattern of behavior expressed over a first multiplicity of digital communications associated with a user;

determine, via the artificial intelligence, an effect of the digital communication on the recipient, wherein the artificial intelligence determines the effect of the digital communication on the recipient based on the tone, the feeling, and the attitude of the content of the digital communication, wherein the effect includes a positive effect, a neutral effect, and a negative effect; and suggest, based on the effect, one or more of removing the recipient of the digital communication or adding a second recipient.

9. The system of claim 8, comprising instructions to:

suggest, in response to the artificial intelligence determining that the digital communication has a negative effect on the recipient, one or more changes to the content of the digital communication, wherein the one or more changes to the content modify the tone, the feeling, or the attitude of the content, wherein the artificial intelligence determines that the one or more changes eliminate the negative effect on the recipient; and edit, in response to the user selecting the one or more changes, the content of the digital communication to conform with a chosen change.

10. The system of claim 8, comprising instructions to:

analyze, via the artificial intelligence, the content of the digital communication for confidential information;

wherein the artificial intelligence identifies confidential information by recognizing a confidentiality label, wherein a confidentiality label includes a text, an audio file, a watermark, or a confidentiality notation attachable to the content of the digital communication;

check, in response to finding confidential information, whether the recipient is authorized to access the confidential information; and warn the user, in response to the recipient not having authorization to access the confidential information, of the confidential information in the digital communication.

11. The system of claim 8, wherein the instructions further cause the system to:

obtain a second digital communication, wherein the second digital communication has one or more of a subject matter related to the digital communication, the recipient of the digital communication, or a sender who is the recipient of the digital communication, wherein the second digital communication contains additional content comprising one or more of a text, an audio file, emojis, images, gifs, and a communication attachable to a digital communication;

analyze, via the artificial intelligence, a tone, a feeling, and an attitude of the additional content of the second digital communication;

update, by the artificial intelligence, the effect of the digital communication on the recipient based on the tone, the feeling, and the attitude of the additional content of the second digital communication; and suggest, in response to the effect being a negative effect associated with the recipient, removing the recipient of the digital communication.

12. The system of claim 11, wherein the second digital communication has the recipient of the digital communication or a sender who is the recipient of the digital communication, comprising instructions to:

analyze, via the artificial intelligence, the subject matter of the second digital communication;

determine, via the artificial intelligence, whether the subject matter of the digital communication relates to the subject matter of the second digital communication; and warn the user, in response to the artificial intelligence determining that the subject matter of the digital communication does not relate to the subject matter of the second digital communication, that subject matter of the digital communication does not relate to subject matter of the second digital communication.

13. The system of claim 11, wherein the second digital communication is of a subject matter related to the digital communication, comprising instructions to:

identify a second recipient of the second digital communication;

determine whether the second recipient of the second digital communication is the recipient of the digital communication; and suggest, in response to determining that the second recipient of the second digital communication is not the recipient of the digital communication, adding the second recipient to the digital communication.

14. The system of claim 11, wherein the second digital communication is of a subject matter related to the digital communication, comprising instructions to:

identify a second recipient of the second digital communication;

detect whether the second recipient of the second digital communication is the recipient of the digital communication;

determine, via the artificial intelligence, an effect of the digital communication on the second recipient, wherein the artificial intelligence determines the effect of the digital communication on the second recipient based on the tone, the feeling, and the attitude of the content of the digital communication, wherein the effect includes a positive effect, a neutral effect, and a negative effect; and suggest, in response to detecting that the second recipient of the second digital communication is not the recipient of the digital communication and to determining that the effect of the digital communication on the second recipient is a positive effect, adding the second recipient to the digital communication.

15. The system of claim 8, wherein the instructions further cause the system to:

obtain a folder, wherein the folder comprises a second multiplicity of digital communications associated with the subject matter of the digital communication, wherein each digital communication of the second multiplicity of digital communications includes a third recipient;

determine whether the third recipient of the second multiplicity of digital communications associated with the subject matter of the digital communication is the recipient of the digital communication; and suggest, in response to determining that the third recipient of the second multiplicity of digital communications associated with the subject matter of the digital communication is not the recipient of the digital communication, adding the third recipient to the digital communication.

16. A method comprising:

obtaining a digital communication, wherein the digital communication includes a recipient, wherein the digital communication includes a subject matter, wherein the digital communication contains content comprising one or more of a text, an audio file, emojis, images, gifs, and a communication attachable to a digital communication;

analyzing, via an artificial intelligence, a tone, a feeling, and an attitude of the content of the digital communication, wherein the tone associated with the digital communication includes an implicit feeling expressed by the digital communication, wherein the feeling associated with digital communication includes an explicit feeling expressed by the digital communication, wherein an attitude includes a pattern of behavior expressed over a first multiplicity of digital communications associated with a user;

determining, via the artificial intelligence, an effect of the digital communication on the recipient, wherein the artificial intelligence determines the effect of the digital communication on the recipient based on the tone, the feeling, and the attitude of the content of the digital communication, wherein the effect includes a positive effect, a neutral effect, and a negative effect; and suggesting, based on the effect, one or more of removing the recipient of the digital communication or adding a second recipient.

17. The method of claim 16, further comprising:

suggesting, in response to the artificial intelligence determining that the digital communication has a negative effect on the recipient, one or more changes to the content of the digital communication, wherein the one or more changes to the content modify the tone, the feeling, or the attitude of the content, wherein the artificial intelligence determines that the one or more changes eliminate the negative effect on the recipient; and editing, in response to the user selecting the one or more changes, the content of the digital communication to conform with a chosen change.

18. The method of claim 16, further comprising:

analyzing, via the artificial intelligence, the content of the digital communication for confidential information;

wherein the artificial intelligence identifies confidential information by recognizing a confidentiality label, wherein a confidentiality label includes a text, an audio file, a watermark, or a confidentiality notation attachable to the content of the digital communication;

checking, in response to finding confidential information, whether the recipient is authorized to access the confidential information; and warning, in response to the recipient not having authorization to access the confidential information, the user of the confidential information in the digital communication.

19. The method of claim 16, further comprising:

obtaining a second digital communication, wherein the second digital communication has one or more of a subject matter related to the digital communication, the recipient of the digital communication, or a sender who is the recipient of the digital communication, wherein the second digital communication contains additional content comprising one or more of a text, an audio file, emojis, images, gifs, and a communication attachable to a digital communication;

analyzing, via the artificial intelligence, a tone, a feeling, and an attitude of the additional content of the second digital communication;

updating, by the artificial intelligence, the effect of the digital communication on the recipient based on the tone, the feeling, and the attitude of the additional content of the second digital communication; and suggesting, in response to the effect being a negative effect associated with the recipient, removing the recipient of the digital communication.

20. The method of claim 19, wherein the second digital communication has the recipient of the digital communication or a sender who is the recipient of the digital communication, further comprising:

analyzing, via the artificial intelligence, the subject matter of the second digital communication;

determining, via the artificial intelligence, whether the subject matter of the digital communication relates to the subject matter of the second digital communication; and warning, in response to the artificial intelligence determining that the subject matter of the digital communication does not relate to the subject matter of the second digital communication, the user that subject matter of the digital communication does not relate to subject matter of the second digital communication.

21. The method of claim 19, wherein the second digital communication is of a subject matter related to the digital communication, further comprising:

identifying a second recipient of the second digital communication;

determining whether the second recipient of the second digital communication is the recipient of the digital communication; and suggesting, in response to determining that the second recipient of the second digital communication is not the recipient of the digital communication, adding the second recipient to the digital communication.

22. The method of claim 19, wherein the second digital communication is of a subject matter related to the digital communication, further comprising:

identifying a second recipient of the second digital communication;

detecting whether the second recipient of the second digital communication is the recipient of the digital communication;

determining, via the artificial intelligence, an effect of the digital communication on the second recipient, wherein the artificial intelligence determines the effect of the digital communication on the second recipient based on the tone, the feeling, and the attitude of the content of the digital communication, wherein the effect includes a positive effect, a neutral effect, and a negative effect; and suggesting, in response to detecting that the second recipient of the second digital communication is not the recipient of the digital communication and to determining that the effect of the digital communication on the second recipient is a positive effect, adding the second recipient to the digital communication.

23. The method of claim 16, further comprising:

obtaining a folder, wherein the folder comprises a second multiplicity of digital communications associated with the subject matter of the digital communication, wherein each digital communication of the second multiplicity of digital communications includes a third recipient;

determining whether the third recipient of the second multiplicity of digital communications associated with the subject matter of the digital communication is the recipient of the digital communication; and suggesting, in response to determining that the third recipient of the second multiplicity of digital communications associated with the subject matter of the digital communication is not the recipient of the digital communication, adding the third recipient to the digital communication.

* * * * *